(12) United States Patent
Varadarajan et al.

(10) Patent No.: US 11,042,553 B2
(45) Date of Patent: *Jun. 22, 2021

(54) FACILITATING CONTENT ENTITY ANNOTATION WHILE SATISFYING JOINT PERFORMANCE CONDITIONS

(71) Applicant: GOOGLE LLC, Mountain View, CA (US)

(72) Inventors: Balakrishnan Varadarajan, Mountain View, CA (US); George Dan Toderici, Mountain View, CA (US); Apostol Natsev, Sunnyvale, CA (US); Weilong Yang, Mountain View, CA (US); John Burge, Santa Clara, CA (US); Sanketh Shetty, Sunnyvale, CA (US); Omid Madani, San Carlos, CA (US)

(73) Assignee: GOOGLE LLC, Mountain View, CA (US)

( * ) Notice: Subject to any disclaimer, the term of this patent is extended or adjusted under 35 U.S.C. 154(b) by 495 days.

This patent is subject to a terminal disclaimer.

(21) Appl. No.: 15/819,050

(22) Filed: Nov. 21, 2017

(65) Prior Publication Data
US 2018/0089200 A1    Mar. 29, 2018

Related U.S. Application Data

(63) Continuation of application No. 14/096,950, filed on Dec. 4, 2013, now Pat. No. 9,830,361.

(51) Int. Cl.
*G06F 16/00* (2019.01)
*G06F 16/2457* (2019.01)
(Continued)

(52) U.S. Cl.
CPC ...... *G06F 16/24578* (2019.01); *G06F 16/285* (2019.01); *G06F 16/78* (2019.01); *G06F 40/169* (2020.01); *G06F 40/295* (2020.01)

(58) Field of Classification Search
CPC .. G06F 16/00; G06F 16/24578; G06F 16/285; G06F 16/78
See application file for complete search history.

(56) References Cited

U.S. PATENT DOCUMENTS 9,305,084 B1 *  4/2016  McCann ........... G06F 16/24578
2008/0114778 A1 *  5/2008  Siegel ..................... G06F 16/90
(Continued)

*Primary Examiner* — Khanh B Pham
(74) *Attorney, Agent, or Firm* — Young Basile Hanlon & MacFarlane, P.C.

(57) ABSTRACT

Facilitating of content entity annotation while maintaining joint quality, coverage and/or completeness performance conditions is provided. In one example, a non-transitory computer-readable medium comprises computer-readable instructions that, in response to execution, cause a computing system to perform operations. The operations include aggregating information indicative of initial entities for content and initial scores associated with the initial entities received from one or more content annotation sources and mapping the initial scores to respective values to generate calibrated scores. The operations include applying weights to the calibrated scores to generate weighted scores and combining the weighted scores using a linear aggregation model to generate a final score. The operations include determining whether to annotate the content with at least one of the initial entities based on a comparison of the final score and a defined threshold value.

20 Claims, 15 Drawing Sheets

(51) Int. Cl.
*G06F 16/28* (2019.01)
*G06F 16/78* (2019.01)
*G06F 40/169* (2020.01)
*G06F 40/295* (2020.01)

(56) References Cited

U.S. PATENT DOCUMENTS

2008/0275890 A1* 11/2008 Chakrabarti .......... G06F 16/958
2009/0240692 A1* 9/2009 Barton .................. G06F 16/735
2012/0158739 A1* 6/2012 Ah-Pine ................ G06F 17/18
707/748

* cited by examiner

FACILITATING CONTENT ENTITY ANNOTATION WHILE SATISFYING JOINT PERFORMANCE CONDITIONS

CROSS REFERENCE TO RELATED APPLICATIONS

The present application claims the benefit of U.S. application Ser. No. 14/096,950, filed Dec. 4, 2013, herein incorporated by reference.

TECHNICAL FIELD

This disclosure relates to processing that facilitates content annotation while satisfying joint performance conditions.

BACKGROUND

With advances in modern technology, numerous different types of content can be processed and/or provided to users via different applications. Further, the plethora of content can include or be related to a wide array of subject matter. Annotation of content is particularly useful and improves efficiency of use and/or further processing of content.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

Systems and methods in this disclosure relate to processing that facilitates content entity annotation while satisfying joint quality, coverage and/or completeness criteria. In one embodiment, a system includes memory storing computer executable components; and a processor configured to execute the computer executable components stored in the memory. The computer executable components include: an aggregation component that aggregates signals indicative of initial entities for content and initial scores associated with the initial entities generated by one or more content annotation sources; and a mapping component that maps the initial scores to calibrated scores within a defined range. The computer executable components also include a linear aggregation component that: applies selected weights to the calibrated scores, wherein the selected weights are based on joint performance conditions; and combines the weighted, calibrated scores based on a selected linear aggregation model of a plurality of linear aggregation models to generate a final score. The computer executable components also include an annotation component that determines whether to annotate the content with at least one of the initial entities based on a comparison of the final score and a defined threshold value.

In another embodiment, a system includes memory storing computer executable components; and a processor configured to execute the computer executable components stored in the memory. The computer executable components include a communication component that: facilitates a display of information indicative of an option to select a linear aggregation model from a plurality of linear aggregation models for generation of a score, the score to be utilized to determine whether to annotate content with a defined entity generated by a content annotation source; and facilitates a display of information indicative of an option to indicate one or more values corresponding to joint performance conditions associated with annotation of the content with the defined entity. The computer executable components also include a processing component that: determines the score based on weighing one or more calibrated scores, and combining the weighed calibrated scores based on the linear aggregation model; compares the score to a defined threshold determined based on the one or more values corresponding to the joint performance conditions; and annotates the content with the defined entity based on whether a defined condition with the score and the defined threshold is met.

In another embodiment, a system includes memory storing computer executable components; and a processor configured to execute the computer executable components stored in the memory. The computer executable components include a processing component that identifies a defined entity with which content is annotated. The processing component also selects advertisement for association with the content based, at least, on a defined relationship between the defined entity and subject matter of the advertisement. The content is annotated with the defined entity based on satisfaction of joint performance conditions upon employing a numerical score associated with the defined entity in a selected linear aggregation model of a plurality of linear aggregation models.

In another embodiment, a method is provided. The method includes: selecting, by a device including a processor, a linear aggregation model for evaluation of one or more candidate entities generated for content by one or more respective content annotation sources; and generating one or more weights for the linear aggregation model based on joint performance conditions. The method also includes applying the one or more weights to the one or more candidate entities, and combining the weighted result to generate a score; and annotating the content with at least one of the one or more candidate entities based on a comparison of the score and a defined threshold value.

One or more of the embodiments can advantageously provide entity annotations for content that satisfies joint criteria for completeness, coverage and/or quality.

Toward the accomplishment of the foregoing and related ends, the one or more embodiments include the features hereinafter fully described and particularly pointed out in the claims. The following description and the annexed drawings set forth in this disclosure detail certain illustrative aspects of the one or more embodiments. These aspects are indicative, however, of but a few of the various ways in which the principles of various embodiments can be employed, and the described embodiments are intended to include all such aspects and their equivalents.

DETAILED DESCRIPTION

Figure 1:
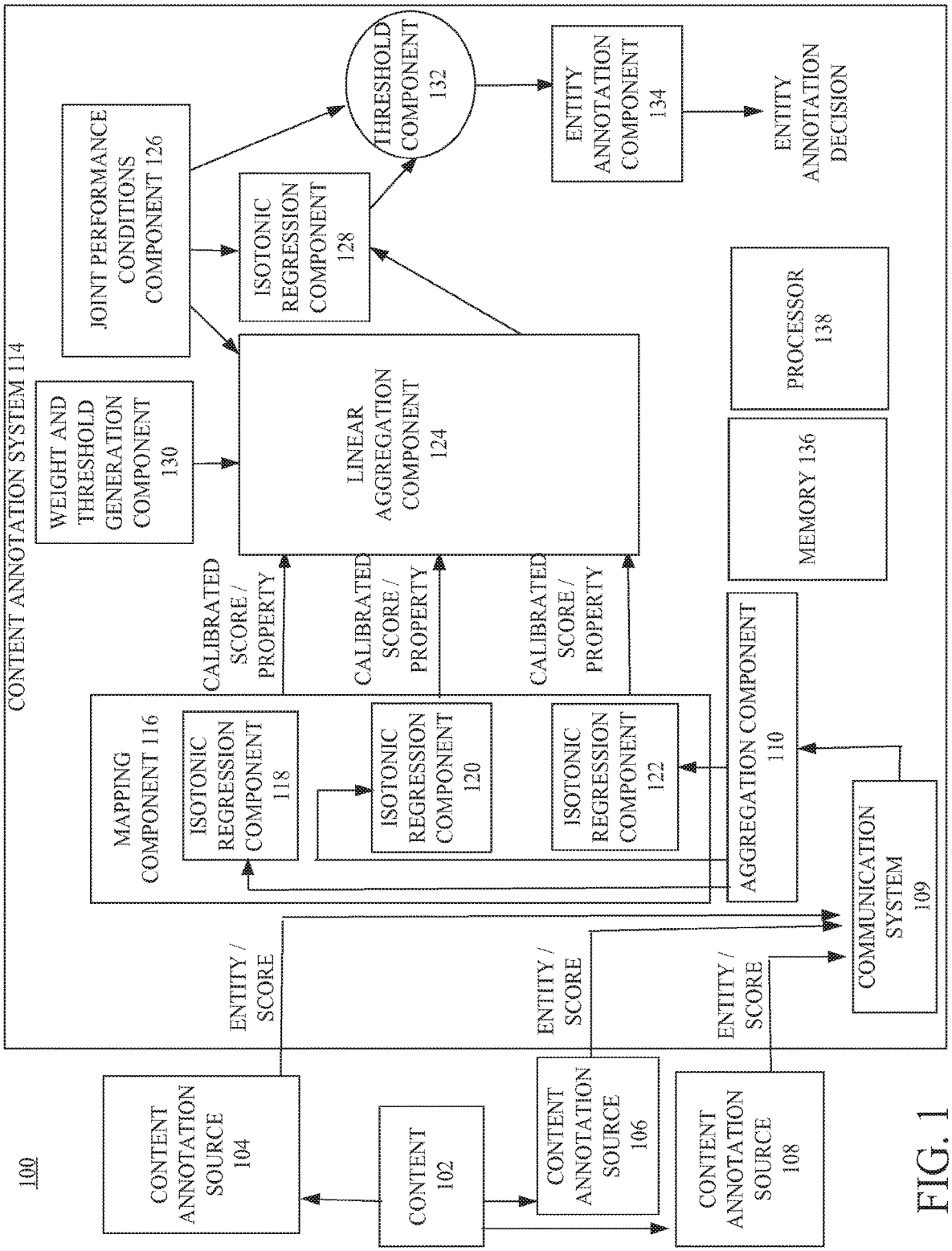
FIG. 1 is an illustration of a block diagram of a non-limiting system that facilitates content entity annotation while satisfying joint performance conditions in accordance with one or more embodiments described herein.

Various embodiments are now described with reference to the drawings, wherein like reference numerals are used to refer to like elements throughout. In the following description, for purposes of explanation, numerous specific details are set forth in order to provide a more thorough understanding of one or more embodiments. It is evident, however, that such embodiments can be practiced without these specific details. In various instances, structures and devices are shown in block diagram form in order to facilitate describing one or more embodiments.

With advances in modern technology, numerous different types of content can be processed and/or provided to users via different applications. Further, the plethora of content can include or be related to a wide array of subject matter. Annotation of content is particularly useful and improves efficiency of use and/or further processing of content. An entity for content is information (e.g., label) associated with or descriptive of one or more features of content. In various embodiments, the features can include the images or subject matter of the content.

In various embodiments, content can be annotated with one or more entities to facilitate use of the content for a number of different tasks including, but not limited to, improved search engine results, relating one person/business entity to another person/business entity and/or targeted advertisements. However, to efficiently perform such tasks, it is desired to have entities that meet a number of joint performance conditions.

For example, the entity can be a label descriptive of the content of a video. A video about a dog might include an entity such as "dog," for example. In some cases, there is a desire to have at least a minimum number of entities for a particular content. Further, in some cases, there are also requirements such as a requirement to annotate a defined number of videos, for example (e.g., half a billion videos). Finally, there can be a requirement to have the entities for content have a defined level of relatedness to the content so as to minimize the likelihood of unrelated entities for particular content. By way of example, but not limitation, a content annotation system can be designed to maximize the quality of the entities while satisfying coverage and completeness constraints.

Completeness, coverage and quality can be important metrics in content entity annotation. As used herein, the term "completeness" refers to the number (or average number) of entity annotations per particular content (e.g., video). The measure of completeness provides an estimate of the level of detail of the content provided from entity annotations. A higher completeness measure refers to a higher number of entity annotations for the content while a lower completeness refers to a lower number of entity annotations for the content.

As used herein, the term "coverage" refers to a portion, or fraction, of content within a set of content, that have at least one entity annotation. For example, coverage can represent the percentage of videos within a set of videos that has at least one entity annotation.

As used herein, the term "quality" refers to the numeric centrality of an entity for content. Numeric centrality refers to the level of relatedness that an entity is relative to particular content. For example, an entity of quality less than a defined value can be considered to be off-topic, or unrelated, to the content while an entity of quality greater than or substantially equal to the defined value can be considered to be central or relevant to the content. In the embodiments described herein, an entity that is central to the content has a higher quality than an entity that is relevant to the content.

One or more embodiments described herein, can advantageously select one or more entities for content annotation while satisfying specified quality, coverage and/or completeness constraints.

Turning now to the drawings, FIG. 1 is an illustration of a block diagram of a non-limiting system that facilitates content entity annotation while satisfying joint performance conditions in accordance with one or more embodiments described herein. In the embodiment shown, system 100 includes content 102, content annotation sources 104, 106, 108 and content annotation system 114.

Content annotation sources 104, 106, 108 can be electrically and/or communicatively coupled to content annotation system 114 to perform one or more functions of system 100. In various embodiments, for example, content annotation system 114 can determine whether to annotate content 102 with one or more entities output from content annotation sources 104, 106, 108 such that joint quality, coverage and completeness constraints are satisfied.

In the embodiment shown, content annotation system 114 includes communication system 109, aggregation component 110, mapping component 116 (which can include isotonic regression components 118, 120. 122), linear aggregation component 124, joint performance conditions component 126, isotonic regression component 128, weight and threshold generation component 130, threshold component 132 and/or entity annotation component 134. In various embodiments, one or more of communication system 109, aggregation component 110, mapping component 116, linear aggregation component 124, joint performance conditions component 126, isotonic regression component 128, weight and threshold generation component 130, threshold component 132 and/or entity annotation component 134 can be electrically and/or communicatively coupled to one another to perform one or more functions of content annotation system 114.

Communication system 109 of content annotation system 114 can transmit and/or receive information from/to content annotation system 114. For example, communication system 109 can receive entity and score information from content annotation sources 104, 106, 108. In various embodiments, communication system 109 can generally transmit and/or receive any number of different types of information, including, but not limited to, one or more entities, one or more corresponding scores for the one or more entities, content (e.g., video, audio), text, joint performance condition values/constraints or the like. In some embodiments, communication system 109 can display information via a user interface (UI) for configuring content annotation system 114 with joint performance condition information, selecting content, or the like.

As shown in FIG. 1, content annotation sources 104, 106, 108 can access or receive content 102. For example, content 102 can be stored at a location remote from content annotation sources 104, 106, 108 in some embodiments while being stored at or received by content annotation sources 104, 106, 108 in other embodiments.

Content annotation sources 104, 106, 108 can evaluate content 102 and determine one or more entities for content 102. In various embodiments, the entities can be central, relevant or off-topic relative to content 102. Scores can characterize whether the entities are central, relevant or off-topic. As such, content annotation sources 104, 106, 108 can output to content annotation sources 114 information indicative of one or more entities for content 102 and corresponding initial scores for the one or more entities. For example, for a particular content 102, content annotation sources 104, 106, 108 can output three entities and three respective scores for the entities.

By way of example, but not limitation, content annotation source 104 can output a first entity for content 102, content annotation source 104 can output a second entity for content 102 and/or content annotation source 106 can output a third entity for content 102. In various embodiments, content annotation sources 104, 106, 108 can each output an entity, which can be combined to generate a set of entities. Each of the entities output can be candidate entities for annotation of content 102.

Because different entities can vary in the level of relevance to content, the quality, or numeric centrality, of the entities can vary from one entity to the next entity, and based on the particular content of interest. Accordingly, in various embodiments, in addition to outputting entities (or information indicative of entities), content annotation sources 104, 106, 108 can also output information indicative of a numerical score associated with the particular entity.

In the embodiments described herein, central, relevant and off-topic entities can be mapped to various integer values for processing described herein to maximize quality while satisfying defined coverage and/or completeness criteria. Each entity can be rated as "central", "relevant" or "off-topic". In some embodiments, central, relevant and off-topic entities for content can be assigned values 2, 1, and −3, respectively, by content annotation sources 104, 106, 108. However, in some embodiments, the numerical scores output by content annotation sources 104, 106, 108 can have non-negative values.

In either case, for each entity, a percentage of the score (e.g., 40% of the score) can be obtained and isotonic regression can be performed by one or more of isotonic regression components 118, 120, 122 to map the numerical score output from content annotation sources 104, 106, 108 to respective values in the range [0, 1]. In various embodiments, the percentage of the score employed can vary or change from time to time based on user-specified constraints and/or system defined parameters.

Turning back to content annotation system 114, communication system 109 can output the entities and scores received from content annotation sources to aggregation component 110. Aggregation component 110 can accumulate, sort, categorize and/or rank the various entities and/or scores received from content annotation sources 104, 106, 108. For example, in some embodiments, aggregation component 110 can sort entities according to the numerical value of the scores associated with the entities.

Mapping component 116 can include one or more isotonic regression components configured to perform isotonic regression on the scores received from content annotation sources 104, 106, 108. Isotonic regression components 118, 120, 122, for example, can perform isotonic regression and map the initial scores output from content annotation sources 104, 106, 108 to a numerical score within a defined range acceptable for subsequent processing by content annotation system 114. In some embodiments, whether an entity is considered by content annotation source that generated the entity to be central, relevant or off-topic, can be employed to allow mapping component 116 to obtain a score in [0,1] for each initial score output from content annotation sources 104, 106, 108.

Accordingly, in to evaluate scores generated from the different content annotation sources 104, 106, 108, isotonic regression components 118, 120, 122 can map each received score to a centrality score that lies in the range [0, 1]. As such, because the mapped, or calibrated, scores are within the range [0, 1], the calibrated scores can be interpreted as probabilities. For example, a calibrated score of 0.4 output from an isotonic regression component can be considered a probability of 40% while a calibrated score of 0.7 can be interpreted as a probability of 70%. In some embodiments, isotonic regression components 118, 120, 122 can map the initial scores output from content annotation sources 104, 106, 108 to scores in the range [0, inf].

Each score (e.g., 0.25, 0.95, 0.5) can be a candidate entity that represents the content. For example, one score can represent "dog," while another score can represent "cat."

Accordingly, without loss of generality, in embodiments in which central, relevant and off-topic entities are indicated by values of 2, 1 and −3, respectively, isotonic regression components 118, 120, 120 can re-scale scores for the three entities as 1, 0.8 and 0, respectively. Moreover, since each entity is positively correlated with the centrality score, higher scores output from content annotation sources 104, 106, 108 can be mapped to higher centrality scores.

Using this information, the problem can be stated as, for each content annotation source t, a function $f_t(s)$ can be identified that closely approximates the numeric centrality score, s, such that Equation 1 results:

$$f_t: R \rightarrow [0,1] \text{ and } s' \geq s \Rightarrow f_t(s') < f_t(s) \quad \text{(Equation 1)}$$

In various embodiments, to compare the scores, each initial score generated by a content annotation source (e.g., content annotation sources 104, 106, 108) can be mapped (e.g., by mapping component 116) to a centrality score that lies in the range [0,1]. In the embodiment shown in FIG. 1, centrality scores are shown as calibrated scores output from isotonic regression components 118, 120, 122. As such, for each content annotation system, t, a function $f_t(s)$ can be determined that closely approximates the mapped value of the score output from content annotation system, t.

To determine $f_t(s)$ for every content annotation system, t, one or more entities (e.g., a content-entity pair) can be aggregated for a particular content annotation system, t. The same process can be employed to learn the function $f_t(s)$ for every content annotation system, t. A centrality score, c, can be determined such that $c \in [0,1]$ based on an initial score associated with the entity. Each entity from the content annotation system, t, can also be accompanied with a score from the respective content annotation system $s \in [0,\infty]$. Thus, for every content annotation system, t, N entities of the form $\{s_j, c_j\}_{\{i=1 \ to \ N\}}$ can be determined.

In some embodiments, the entities are sorted by the value for $s_i$ as $s_i \leq s_{i+1}$. Accordingly, the entities can be sorted based on increasing value of $s_i$. For example, aggregation component 110 can sort entities by associated initial score.

In some embodiments, isotonic regression components 118, 120, 122 can provide the estimated centrality score, $ĉ_i$, for every i that minimizes Equation 2 shown below:

$$\Sigma_i (c_i - ĉ_i)^2 \qquad \text{(Equation 2)}$$

such that $ĉ_i \leq ĉ_{i+1}$. Equation 2 can be solved using standard methods of isotonic regression. In some embodiments, the mapped score in the set [0, 1] from the information generated by content annotation sources 104, 106, 108 along with the scores or discrete features are concatenated to form a dense input vector.

Since the mapped scores from each of the content annotation sources 104, 106, 108 are in the range [0, 1], the calibrated centrality scores in [0, 1] output from isotonic regression components 118, 120, 122 can be interpreted as a probability that an entity is central given the score from the individual content annotation source.

Linear aggregation component 124 can weigh and combine the information output from mapping component 116 to generate a final score, and threshold component 132 can compare the final score to a defined threshold value. Entity annotation component 134 can determine whether to annotate content 102 with one or more of the entities output from content annotation sources 104, 106, 108 based on whether the final score is less than, greater than or equal to (or substantially equal to) the defined threshold value. In some embodiments, weight and threshold generation component 130 can generate one or more weights and/or the defined threshold based on information generated by joint performance conditions component 126.

Joint performance conditions component 126, for example, can generate an equation, or steps to be performed to calculate a value, based on specified quality, coverage and/or completeness conditions and/or assumptions about the content annotation sources 104, 106, 108 and/or the independence of content annotation sources 104, 106, 108. In some embodiments, the weights and/or defined threshold value can be provided to linear aggregation component 124 for training linear aggregation component 124 and/or one or more components of linear aggregation component 124 and/or content annotation system 114. One of a plurality of candidate linear aggregation models can be selected using one or more of the weights that allows the quality, coverage and/or completeness conditions specified to be met. As such, weight and threshold generation component 130 can generate a first weight and a second weight. The two weights can be received by linear aggregation component 124 and used to weight the calibrated scores output from isotonic regression components 118, 120, 122 according to one or more of three different linear aggregation models of linear aggregation component 124.

In one embodiment, linear aggregation component 124 can select the linear aggregation model, weight and/or threshold that results in the joint performance conditions specified in joint performance conditions component 126 being met. In some embodiments, the linear aggregation model can be pre-selected and/or statically determined irrespective of the weights and/or threshold generated by weight and threshold generation component 130.

In some embodiments, once a weight, threshold and/or linear model combination is identified that meets a defined set of joint quality, coverage and completeness constraints, the combination can be employed with subsequent entities and scores output from content annotation sources 104, 106, 108. In other embodiments, one or more of the weights and/or threshold and/or linear model can be generated and/or selected anew with one or more new entities and/or scores output from content annotations sources 104, 106, 108. If/when the joint conditions change, the weight and threshold generation component 130 can generate new weight and threshold information and select a new linear aggregation model to meet the joint conditions.

Memory 136 can store information transmitted to, received by and/or processed by content annotation system 114 (and/or any components of content annotation system 114). In various embodiments, memory 136 can store information including, but not limited to, one or more entities generated by content annotation sources 104, 106, 108, one or more initial scores associated with the one or more entities, one or more calibrated scores, one or more weights and/or a defined threshold value, linear aggregation model information, isotonic regression information, properties associated with the calibrated scores or the like.

Processor 138 can perform any number of functions described herein including, but not limited to, performing random initialization or gradient-based initialization of weights, performing linear aggregation operations, aggregating one or more entities and/or scores, performing isotonic regression, training linear aggregation component 124 or the like. In some embodiments, processor 138 can determine a calibrated score from one or more initial scores, perform linear aggregation, generate a defined threshold value, derive one or more equations (or processes for performing one or more analyses) based on joint performance conditions or the like. In some embodiments, processor 138 can apply the entity annotation to the content if the final score meets a defined condition relative to the defined threshold value.

Linear aggregation component 124 will be described in greater detail with reference to FIG. 2. Linear aggregation component 124 can include probability-based aggregation (PBA) component 200, probability threshold-based aggregation component (PTBA) component 202, modified probability threshold-based aggregation component (MPTBA) component 204, weight information component 206, memory 136 and/or processor 138. In various embodiments, one or more of PBA component 200, PTBA component 202, MPTBA component 204, weight information component 206, memory 136 and/or processor 138 can be electrically and/or communicatively coupled to one another to perform one or more functions of linear aggregation component 124. Repetitive description of like elements employed in other embodiments described herein is omitted for sake of brevity.

As shown, linear aggregation component 124 can include structure and/or functionality for implementing one or more different linear aggregation models. PBA component 200, PTBA component 202 and MPTBA component 204 perform one or more operations/acts in accordance with one or more respective linear aggregation models. Accordingly, with reference to FIGS. 1 and 2, different linear aggregation models of linear aggregation component 124 can be employed for combining calibrated scores output from isotonic regression components 118, 120, 122 to determine whether to annotate content 102 with one or more entities from content annotation sources 104, 106, 108.

PBA component 200 performs linear aggregation of probabilities. For example, PBA component 200 includes structure and/or functionality to perform linear aggregation based on considering centrality scores as probabilities. As described with reference to FIG. 1, calibrated scores from isotonic regression components 118, 120, 122 can be interpreted as probabilities. These scores can be weighted and combined by PBA component 200.

Specifically, the numerical scores weighed can be indicative of the probability that an entity, a, is central for a particular content. For a content-entity pair, a, where a=(v, e), the calibrated centrality score from the content annotation source, $t \in C$, can be denoted as $f_t^a(s_t)$. The Boolean variable associated with the discrete signal $t \in W$ can be denoted as $b_t^a$. The rule identified by Equation 3 below can be employed to determine whether an entity, a, will be associated with particular content (e.g., content 102) (or not associated with the particular content).

$$I(\Sigma_{t \in C} \lambda_t f_t^a(s_t) + \Sigma_{t \in W} \lambda_t b_t^a \geq \tau) \quad \text{(Equation 3)}$$

where $\lambda_t$ are the weights employed by linear aggregation component 124 (or the linear aggregation model used by linear aggregation component 124). In some embodiments, weight and threshold generation component 130 can generate the weights as described in greater detail with reference to FIG. 3.

Weights, $\lambda_t$, can be applied to the initial scores from a content annotation system, t, (or to the calibrated scores), where C is the entire set of content annotation sources and I is the summation index.

When the generated weights are applied to the different scores for the different entities, and the weighted valued are combined, a comparison to a defined threshold value, $\tau$, can be employed to determine whether to select one or more of the entities for annotation. In one embodiment, weighted and combined scores result in a final score. If the final score is within an acceptable range such that the final score is not too high or too low, the entity is selected for annotation of the content. In some embodiments, the acceptable range is set such that the defined threshold value is not too high or too low so as to obtain satisfactory coverage and/or completeness while maximizing quality. Accordingly, in some embodiments, the threshold, $\tau$, can be chosen to maximize the number of entities that are central while also reducing the number of entities that are off-topic.

In the embodiment described, if Equation 3 is true, and the weighted scores are therefore greater than or equal to the threshold, then one or more of the entities is associated with the particular content. Accordingly, the entities that pass the threshold of the linear aggregation component (e.g., linear aggregation component 124) can be used to annotate the content. If Equation 3 is not true, and the weighted scores are therefore less than the threshold, then the one or more entities is not associated with the particular content. PTBA component 202 performs linear aggregation based on thresholding the product of the log of the probabilities (e.g., initial scores or calibrated scores) generated for the one or more entities. For example, PTBA component 202 can interpret the centrality scores generated from the isotonic regression component as probabilities and threshold the product of the probabilities. In some embodiments, $P_t^a(c|s_t)$ represents the probability that an entity, a, is central given the score, $s_t$, from content annotation source, t. The score $s_t$ is the raw score and $P_t^a(c|s_t)$ can denote the calibrated score that is trained using isotonic regression. Including continuous and discrete content annotation sources, there can be a total of $|C|+|W|$ content annotation sources in some embodiments.

Using Bayes' rule, Equation 4 is as follows:

$$p^a(c|s_{1:|C|+|W|}) = p^a(s_{1:|C|+|W|}|c)P(c)/P^a(s_{1:|C|+|W|}) \quad \text{(Equation 4)}$$

Assuming that the content annotation sources are independent of one another, the Equation 4 can be decomposed as shown in Equation 5 below:

$$p^a(c|s_{1:|C|+|W|}) = P(c)\pi_{t \in C \cap W} P_t^a(c|s_t)/P(c) \quad \text{(Equation 5)}$$

The rule identified by Equation 6 below can be employed to determine whether particular content will be annotated with entity, a. In particular, in this embodiment, an entity, a, is associated with particular content if the entity is considered to be central with a confidence probability of at least q.

$$\Sigma_{t \in C \cap W} \log(P_t^a(c|s_t)) \geq \tau \quad \text{(Equation 6)}$$

where $\tau$ is as described in Equation 7 below:

$$\tau = \log q + (|C \cap W| - 1)\log P(c) \quad \text{(Equation 7)}$$

Accordingly, if Equation 6 is true, and the weighted scores are therefore greater than or equal to the threshold, then the content is annotated with entity, a. If Equation 6 is not true, and the weighted scores are therefore less than the threshold, then the content is not annotated with entity, a.

MPTBA component 204 performs linear aggregation based on thresholding the product of the log of the probabilities (e.g., initial scores or calibrated scores) generated for the one or more entities (while assuming weak dependence between the content annotation sources). While PTBA component 204 assumes the content annotation sources are independent, MPTBA component 204 assumes a dependence (albeit a weak dependence) between content annotations sources.

Specifically, in the embodiment of MPTBA component 204, $\lambda_t$ can be a non-unit weight. The non-unit weight, $\lambda_t$, can be applied to the log-probabilities to capture weak dependence between the content annotation sources. The modified rule for the second embodiment of the linear aggregation component shown in Equation 6 above is then Equation 8 shown below:

$$\Sigma_{t \in C \cap W} \lambda_t \log(P_t^a(C|s_t)) \geq \tau \quad \text{(Equation 8)}$$

If Equation 8 is true, and the weighted scores are therefore greater than or equal to the threshold, then the content is annotated with the entity. If Equation 8 is not true, and the weighted scores are therefore less than the threshold, then the content is not annotated with entity, a.

To simplify the notations, $x_a$ can be employed to denote the union of the set of mapped centrality scores from various continuous content annotation sources and the boolean variables from the discrete content annotation sources. Thus, for any entity, a, the rule previously shown as becomes as shown in Equation 9 below:

$$\Lambda^T x_a \geq \tau \quad \text{(Equation 9)}$$

For the probabilities, $P_t^a(c|s_t)$, calibrated scores $f_t^a(s_t)$ can be employed as a proxy. The variable $\Lambda$ can denote the corresponding vector of $\lambda_t$ used to determine the weight given to each content annotation source, t, by linear aggregation component 124 (or PBA component 200, PTBA component 202 and/or MPTBA component 204). For example, $\Lambda$ can be the set of $\lambda_t$ from the linear aggregation model. The $\lambda$ are then provided in the completeness, coverage and quality equations.

Weight information component 206 can include weights and/or information indicative of weights for use by one or more of PBA component 200, PTBA component 202 and/or MPTBA component 204. Weights and/or information indicative of weights can be employed by PBA component 200, PTBA component 202 and/or MPTBA component 204 to weigh the various calibrated scores associated with the entities. The one or more weights and/or a defined threshold value can be calculated to satisfy quality, coverage and/or completeness constraints.

With reference to joint performance conditions component 126 of FIG. 1, information can be determined for computing quality, coverage and/or completeness equations in various embodiments. For example, in some embodiments, the problem of finding $\Lambda$ and $\tau$ is common for linear aggregation models associated with PBA component 200 and/or MPTBA component 204, and the solution can be addressed as follows by joint performance conditions component 126.

The quality, or numeric centrality score, can be maximized for specified completeness and coverage thresholds. For example, in the following embodiments, optimization of quality, or numeric centrality, can be provided given that an entity annotation meets or exceeds a fixed threshold of completeness and a fixed threshold of coverage. Optimization of quality, or numeric centrality, with joint optimization of completeness and coverage is advantageous compared to optimization of completeness alone, for example, because if only completeness optimization was performed, a single piece of content (e.g., single video) may receive numerous annotations (and most videos would not receive any annotations). Accordingly, it is desirable to jointly optimize coverage and completeness while optimizing quality, or numeric centrality.

Joint performance conditions component 126 assumes an array of N annotations, each associated with a dense D-dimensional vector of mapped centrality scores from various classes denoted as $x_a \in R^D$. Accordingly, $x_a$ can be a dense D-dimensional vector whose values can be anywhere between $-\infty$ and $+\infty$. In the embodiment described, D can be the number of input fusion signals for a particular content annotation pair.

Each entity, a, can correspond to a pair of identifiers, $l_a$ and $id_a$. Each entity, a, can also have an accompanying centrality score (e.g., quality score), $s_a$. Thus, each entity, a, can be associated with a 4-tuple of information as shown in Equation 10:

$$\{id_a, l_a, x_a, s_a\}_{a=1 \text{ to } N} \quad \text{(Equation 10)}$$

V can represent the set of content for which the above set of entities is provided. Accordingly, Equation 11 results:

$$\{id: id \in id_a\} \subseteq V \quad \text{(Equation 11)}$$

Given a D-dimensional vector weight vector, $\Lambda$, and a threshold, $\tau$, completeness, coverage and quality/numeric centrality can be defined as shown in Equations 12, 13 and 14, respectively:

$$\text{completeness}(\Lambda, \tau) = \frac{1}{|v|} \sum_a I(\Lambda^T x_a \geq \tau) \quad \text{(Equation 12)}$$

$$\text{coverage }(\Lambda, \tau) = \frac{1}{|v|} |id: \exists\, a: id_a = id \text{ and } \Lambda^T x_a \geq \tau| \quad \text{(Equation 13)}$$

$$\text{quality/numeric centrality}(\Lambda, \tau) = \quad \text{(Equation 14)}$$
$$\left(\sum_a s_a I(\Lambda^T x_a \geq \tau)\right) / \left(\sum_a I(\Lambda^T x_a \geq \tau)\right)$$

The problem of maximizing quality/numeric centrality given a minimum level of completeness and coverage can be solved using the following Equation 15 below:

$$\arg\max{}_{\{\Lambda, \tau\}}(\text{numeric centrality}(\Lambda, \tau) \text{ such that completeness}(\Lambda, \tau) \geq C_{min} \text{ and coverage}(\Lambda, \tau) \geq G_{min}) \quad \text{(Equation 15)}$$

where $C_{min}$ and $G_{min}$ are the specified minimum desired levels of completeness and coverage. Equation 15 provides a solution to the problem of finding $\Lambda$ and $\tau$ for PBA component 200 and/or MPTBA component 204. Joint performance conditions component 126 can store one or more information, operations/acts or processes for computing Equations 12, 13 and/or 14.

Completeness can be viewed as an integer constraint and the coverage as a set cover constraint. If the constraint was on completeness alone, Equation 12 could be solved using integer programming. Integer programming employs mathematical optimization or feasibility in which one or more of the variables are restricted to be integers. However, the constraint on the coverage (in addition to completeness) makes the problem more complex. Therefore, the power of computing can be employed to solve the optimization.

Figure 3:
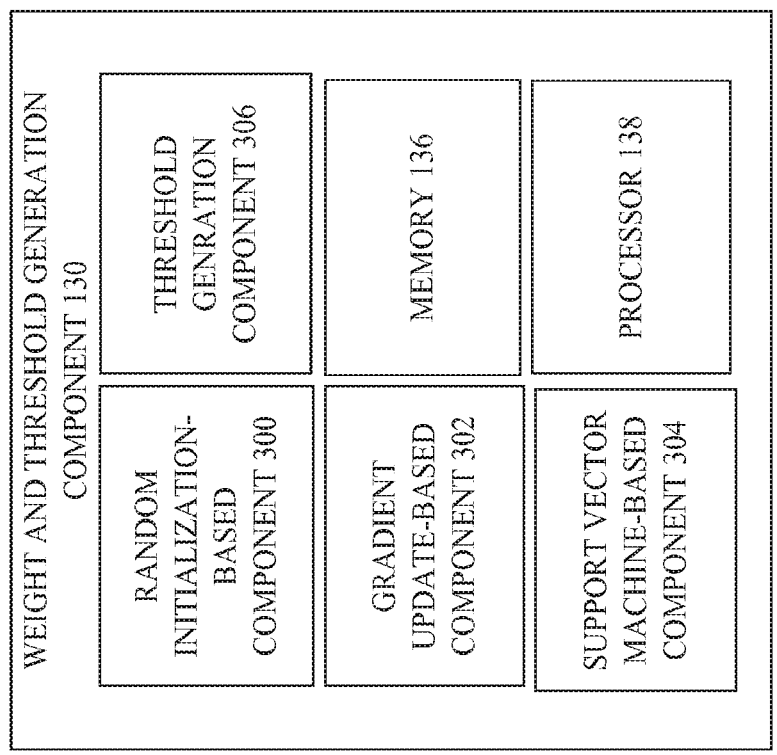
FIG. 3 is an illustration of a block diagram of a non-limiting weight and threshold generation component of a content annotation system of FIG. 1 that facilitates content entity annotation while satisfying joint performance conditions in accordance with one or more embodiments described herein.

Turning now to FIG. 3, shown is an illustration of a block diagram of a non-limiting weight and threshold generation component of a content annotation system of FIG. 1 that facilitates content entity annotation while satisfying joint performance conditions in accordance with one or more embodiments described herein.

Weight and threshold generation component 130 can include random initialization-based component 300, gradient update-based component 302, support vector machine-based component 304, threshold generation component 306, memory 136 and/or processor 138. In various embodiments, one or more of random initialization-based component 300, gradient update-based component 302, support vector machine-based component 304, threshold generation component 306, memory 136 and/or processor 138 can be electrically and/or communicatively coupled to one another to perform one or more functions of weight and threshold generation component 130. Repetitive description of like elements employed in other embodiments described herein is omitted for sake of brevity.

In various embodiments, weight and threshold generation component 130 can determine one or more linear aggregation model weights, $\lambda_t$, and/or a threshold value to employ with PBA component 200, PTBA component 202 and/or MPTBA component 204 of linear aggregation component 124 to meet the joint quality, completeness and coverage constraints. The weights and/or threshold information can be employed by linear aggregation component 124 in one or more of PBA component 200, PTBA component 202 and/or MPTBA component 204 to determine which model outputs the best joint performance and such model can then be employed in various embodiments of determining whether the current and/or future entities are associated with various content.

In some embodiments, weight and threshold generation component 130 can determine the weights by performing a heuristic search. Different methods can be employed by random initialization-based component 300, gradient update-based component 302 and/or support vector machine-based component 304.

In some embodiments, random initialization-based component 300 can perform the following operations to generate one or more weights for use by linear aggregation component 124. For all t, initialize values for linear aggregation model weights, $\lambda_t$, randomly within the range of values

[0,1]. Random initialization-based component 300 can then set a step size value to be equal to (or substantially equal to) a value for $s_{max}$. While the step size is greater than or equal to $s_{min}$, for each t, random initialization-based component 300 can iteratively adjust the value for each linear aggregation model weights, $\lambda_t$, from −1 to 1 in steps of s.

Next, for a new setting of weight vector, Λ, random initialization-based component 300 can determine a value for a threshold, τ, in O(N) such that the number of entities meeting or exceeding the coverage and completeness thresholds satisfies the minimum requirements of completeness and coverage. For the current setting of values for the weight vector and threshold, {Λ, τ}, random initialization-based component 300 can determine the required quality.

In some embodiments, random initialization-based component 300 can select the $\lambda_t$ that yields the highest quality. In some embodiments, selecting the $\lambda_t$ can result in optimizing an estimate $\tilde{\lambda}_t$ in O(N/s).

Random initialization-based component 300 can then optimize an estimate $\tilde{\lambda}_t$ in O(N/s) based on selection of the $\lambda_t$ that yields the highest quality, and replace the older value of $\lambda_t$ with $\tilde{\lambda}_t$. In some embodiments, random initialization-based component 300 can reduce the step size by half of the current step size value while the step size is greater than or equal to $s_{min}$.

Random initialization-based component 300 can perform numerous random initializations of, and corresponding processing of, $\lambda_t$, as described above. For example, random initializations can be performed substantially in parallel employing one or more devices using flume.

Figure 2:
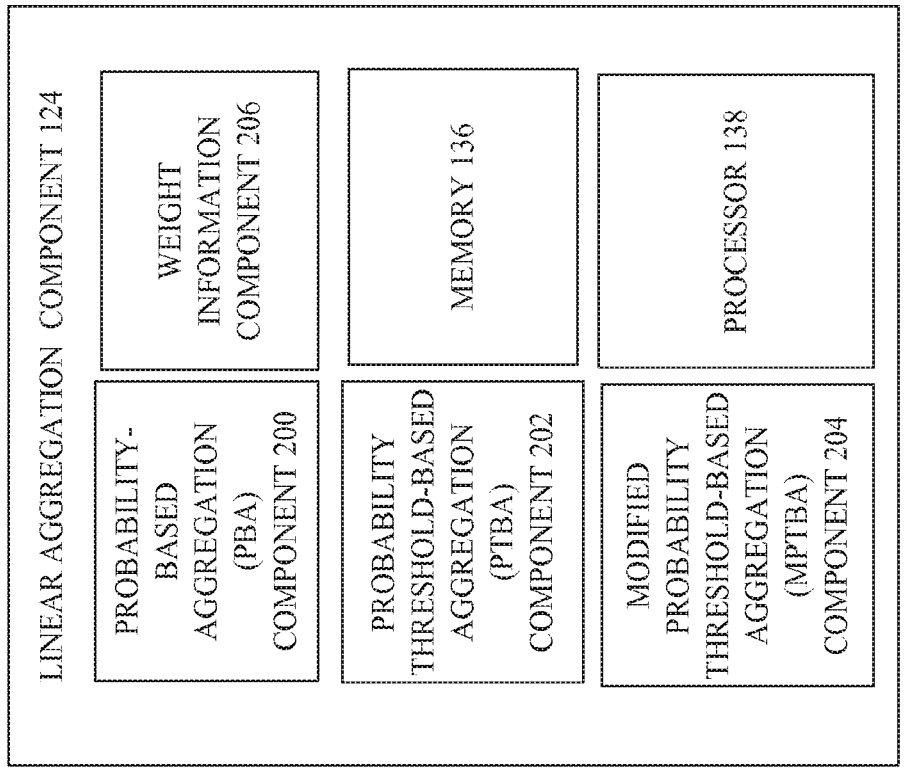
FIG. 2 is an illustration of a block diagram of a non-limiting linear aggregation component of the content annotation system of FIG. 1 that facilitates content entity annotation while satisfying joint performance conditions in accordance with one or more embodiments described herein.

With reference to FIGS. 2 and 3, linear aggregation component 124 can receive the generated weights and select a linear aggregation model that, in conjunction with the weights, maximizes accuracy on the data of linear aggregation component 124. In some embodiments, the data of linear aggregation component 124 is training data. As such, in some embodiments, the entities and/or calibrated scores are actual data output from content annotation sources for content to be annotated. In other embodiments, the entities and/or calibrated scores are training data used to train the linear aggregation component 124 such that quality, coverage and completeness requirements are satisfied for entities and/or calibrated scores received by linear aggregation component 124 in the future.

Gradient update-based component 302 is another component of weight and threshold generation component 130 that can be employed to generate $\lambda_t$ while satisfying minimum coverage and completeness constraints. As with the random initialization-based component 300, gradient update-based component 302 can, for all t, initialize values for linear aggregation model weights, $\lambda_t$, randomly within the range of values [0,1].

Gradient update-based component 302 can increase or decrease a step size value and/or a learning rate to increase the likelihood of an improvement in objective function. For example, in some embodiments, a resilient backpropagation (RPROP) method is employed to update the weights of the linear aggregation model. By way of example, but not limitation, RPROP considers only the sign (as opposed to the magnitude) of a partial derivative over all patterns, and acts independently on each linear aggregation model weight.

For each weight, if there was a sign change of the partial derivative of the total error function compared to the last iteration, the updated value for that weight is multiplied by a factor $\eta^-$, where $\eta^-<1$. By contrast, in embodiments in which the last iteration produced the same sign, the updated valued for the weight is multiplied by a factor of $\eta^+$, where $\eta^+>1$. The updated values can be calculated for each weight in the above manner, and each weight can be changed by its own update value, in the opposite direction of that weight's partial derivative, so as to minimize the total error function. The value of $\eta^+$ can be empirically set to 1.2 and the value of $\eta^-$ can be set to 0.5.

In some embodiments, gradient update-based component 302 can compute the approximate gradient, g(w) from the difference in the objective function as shown in Equation 16 below:

$$g(w) \approx \frac{Q(w - \delta w_j) - Q(w + \delta w_j)}{2\delta w_j} \quad \text{(Equation 16)}$$

In another embodiment, gradient update-based component 302 can employ a gradient-based approach to facilitate solving for $\lambda_t$ while satisfying minimum coverage and completeness requirements. As with the random initialization-based component 300, gradient update-based component 302 can, for all t, initialize values for linear aggregation model weights, $\lambda_t$, randomly within the range of values [0,1].

In this embodiment, gradient update-based component 302 can perform gradient-based updating to the linear aggregation model weights, $\lambda_t$, until convergence. By way of example, but not limitation, gradient update-based component 302 can employ operations/acts based on or in accordance with adaptive gradient algorithm (e.g., ADAGRAD). ADAGRAD is an adaptive gradient approach that can be employed to determine the weights of the linear aggregation in some embodiments. the adaptive gradient approach computes the next set of updated weights by solving the minimization problem in Equation 17 (shown below) given the learning rates and the various regularization parameters. In various embodiments, Equation 17 can be solved exactly and has a closed form.

In some embodiments, a weight value update similar to that which would be employed for ADAGRAD can be as follows in Equation 17 below:

$$w_{t+1} \min_w [\eta(-g(w_t)^T w + \lambda_1 \|w\|_1 + \|w\|_2^2)] \quad \text{(Equation 17)}$$

In some embodiments, random initialization of values for linear aggregation model weights, $\lambda_t$, as described with reference to random initialization-based component 300 and/or gradient update-based component 302 can be performed substantially in parallel employing one or more devices using flume. Corresponding processing of $\lambda_t$ can be performed.

In another embodiment, weight and threshold generation component 130 can include support vector machine (SVM)-based component 304 to facilitate solving for $\lambda_t$ while satisfying minimum coverage and completeness requirements. For example, SVM-based component 304 can perform SVM-based initialization of linear aggregation model weights, $\lambda_t$. In some embodiments, for binary settings, SVM-based component 304 can perform parameter sweeping over L2 weight and negative-class weight of lib-linear. For graded settings where η (v,e) takes multiple values, $\lambda_t$ can be varied. For example, the lib-linear weight, $\lambda_t$, can be set to Equation 18:

$$\frac{|\eta(v, e) - \lambda|}{|\eta_{max} - \lambda|}$$

In some embodiments, the threshold can be specified to be a value such that the defined/requested coverage and completeness constraints are satisfied. The threshold can be adjusted based on the constraints. For example, if higher coverage is desired, the threshold can be specified to be a lower value. If less coverage is desired, the threshold can be specified to be a higher value.

Accordingly, based on weight and threshold information generated by weight and threshold generation component 130, linear aggregation component 124 learning can be facilitated in a manner that combines the estimates of centrality scores for content and are able to improve quality. Specifically, the weights, $\lambda_i$, obtained at linear aggregation component 124 can be input into Equations 12, 13 and 14 stored and/or provided by joint performance conditions component 126.

Figure 4:
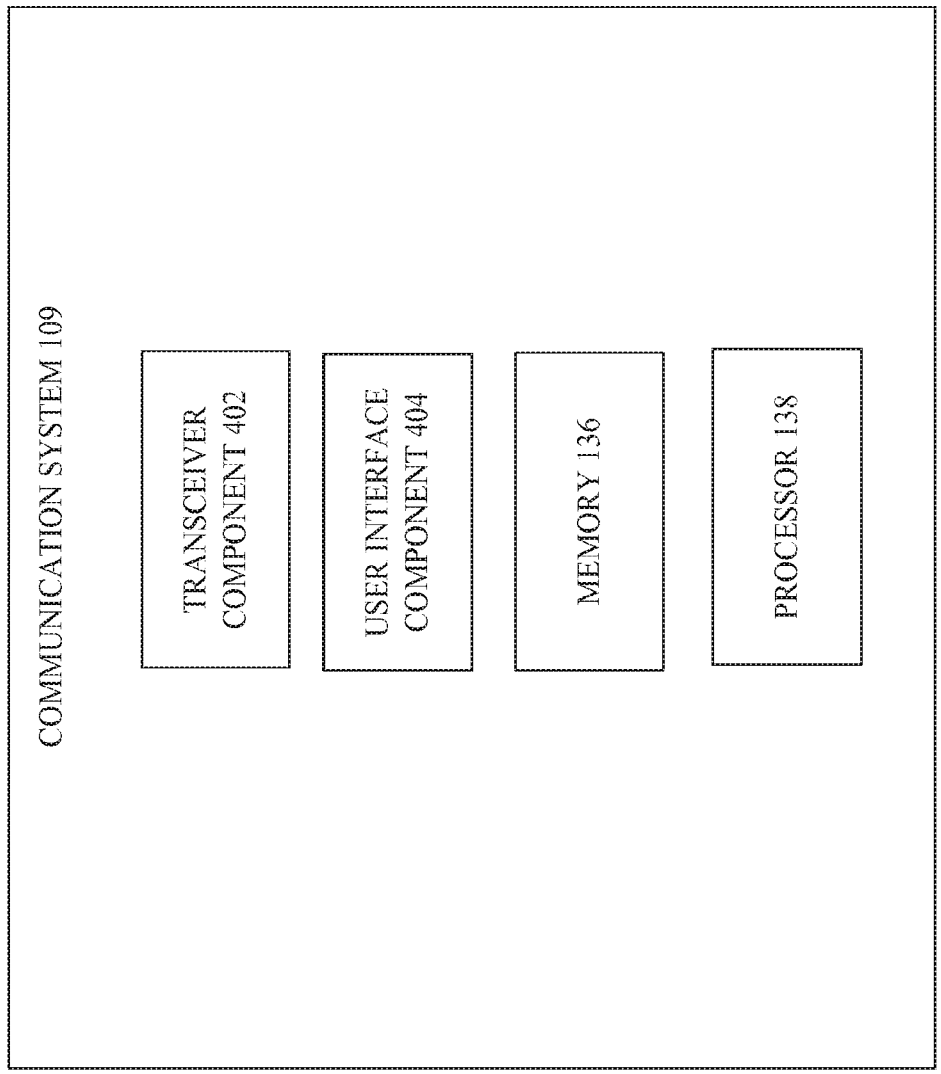
FIG. 4 is an illustration of a block diagram of a non-limiting communication system of a content annotation system of FIG. 1 that facilitates content entity annotation while satisfying joint performance conditions in accordance with one or more embodiments described herein.

Turning now to FIG. 4, shown is an illustration of a block diagram of a non-limiting communication system of a content annotation system of FIG. 1 that facilitates content entity annotation while satisfying joint performance conditions in accordance with one or more embodiments described herein. Communication system 109 can include transceiver component 402, user interface component 404, memory 136 and/or processor 138. In various embodiments, one or more of transceiver component 402, user interface component 404, memory 136 and/or processor 138 can be electrically and/or communicatively coupled to one another to perform one or more functions of communication system 109. Repetitive description of like elements employed in other embodiments described herein is omitted for sake of brevity.

Transceiver component 402 can be configured to transmit and/or receive various different types of information from/to content annotation system 114. The information can be any number of different types of media (e.g., video, audio, text, or a combination of the video, audio and/or text), data, graphs or the like. As described, the information can include one or more entities, one or more initial scores or the like.

In some embodiments, transceiver component 402 can receive information indicative of content for which annotation is to be performed, information indicative of one or more linear aggregation models that can be selected for use in determining an entity with which the content is to be annotated, information indicative of one or more values for completeness, coverage and/or quality requirements to be met with the entity selected for annotation of the content or the like. In some embodiments, transceiver component 402 can output annotated content, a selected entity with which content will be annotated or the like.

User interface component 404 can generate one or more UIs and/or facilitate processing of information received via the one or more UIs. In various embodiments, user interface component 404 can generate a UI that displays information that can be selected to perform content annotation. In some embodiments, user interface component 404 can display any embodiment of user interface 500 described and/or shown with reference to FIGS. 5-9. FIGS. 5-9 are illustrations of non-limiting user interfaces for a content annotation system that facilitates content entity annotation while satisfying joint performance conditions in accordance with one or more embodiments described herein.

The content annotation system for which user interface 500 will be shown and described can include structure and/or functionality of one or more components of content annotation system 114 in various embodiments. User interface 500 can be generated by user interface component 404 of FIG. 4. Repetitive description of like elements employed in other embodiments described herein is omitted for sake of brevity.

Figure 5:
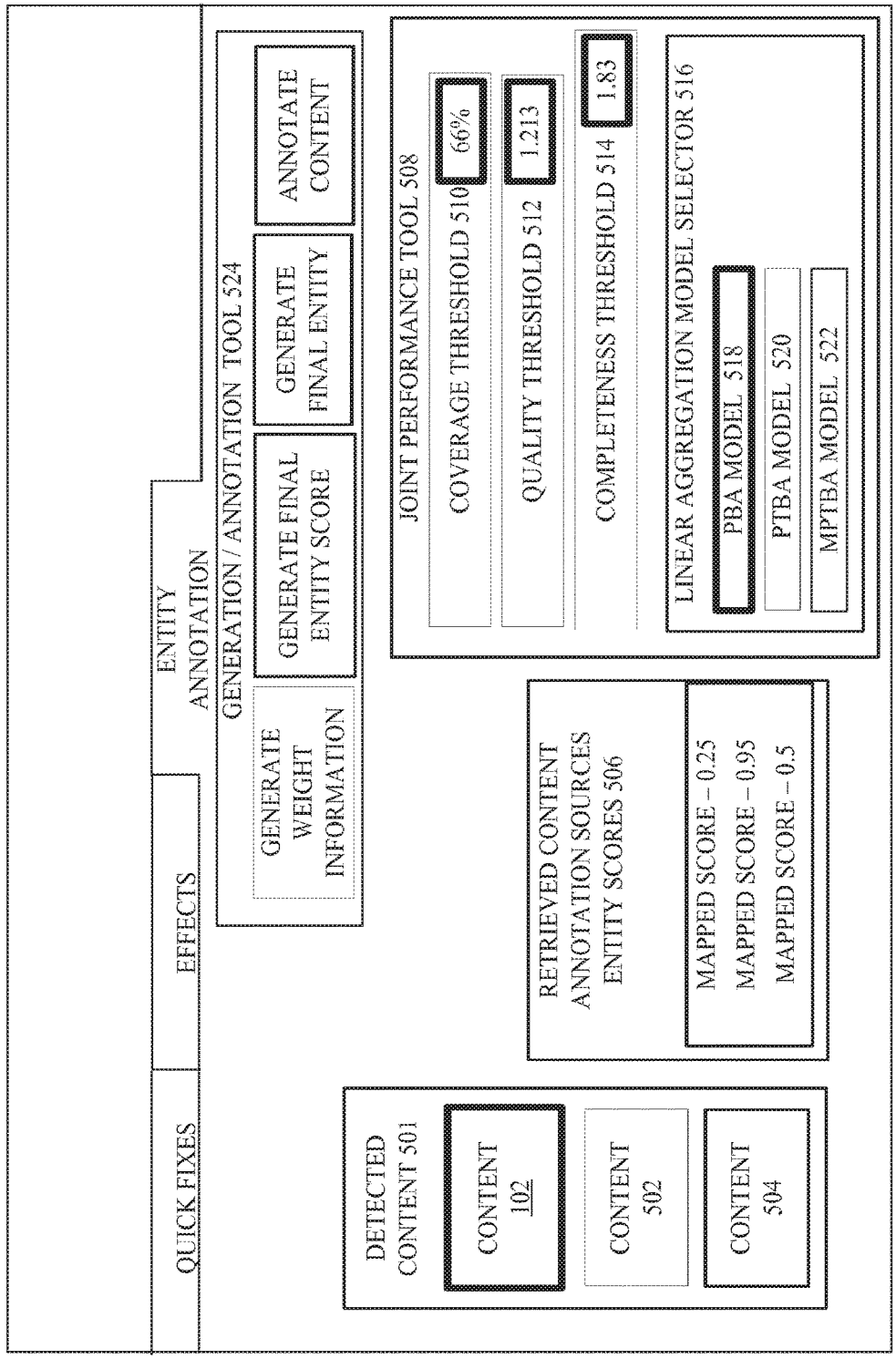
FIGS. 5-9 are illustrations of non-limiting user interfaces for a content annotation system that facilitates content entity annotation while satisfying joint performance conditions in accordance with one or more embodiments described herein.

As shown in FIG. 5, UI 500 can include a first display region 501 that can display information indicative of content 102, 502, 504. Content 102, 502, 504 can be candidate content that content annotation system 114 can determine whether to annotate with one or more entities output from one or more content annotation sources, for example.

In various embodiments, content 102, 502, 504 can be or include video content (e.g., sports video, weather video, news video), social media content (e.g., information about friends or other connections in FACEBOOK® system) and/or website content (e.g., advertisement information, search information, search result information).

One or more of content 102, 502, 504 can be selected by user activation of a portion of UI 500 corresponding to content 102, 502, 504. In some embodiments, one or more portions of UI 500 is a touch screen. In some embodiments, one or more portions of UI 500 is configured to receive information entered via textbox or by selection via computer mouse. As such, any number of different approaches can be employed to select or provide information for any aspect of information provided via UI 500.

User interface 500 can also include a second display region 506 that displays one or more numerical scores associated with one or more respective entities for selected content. For example, in the embodiment shown, a first content annotation source can provide a first entity describing content 102 and an initial score. The initial score can be mapped to 0.25 by an isotonic regression component. A second content annotation source can provide a second entity describing content 102 and an initial score that can be mapped to 0.95. A third content annotation source can provide a third entity and an initial score that can be mapped to 0.5.

User interface 500 can also include a third display region 508 that displays information associated with joint performance requirements for entity annotation for content. As shown, a first subregion 510 of UI 500 can be provided for receiving information indicative of a desired coverage threshold, a second subregion 512 of UI 500 can be provided for receiving information indicative of a desired quality threshold and/or a third subregion 514 of UI 500 can be provided for receiving information indicative of a desired completeness threshold. As such, in some embodiments, coverage, quality and/or completeness thresholds can be specified by via UI 500. In other embodiments, coverage, quality and/or completeness can be accessed by content annotation system 114 (e.g., over a network from a location remote from content annotation system 114), stored at content annotation system 114 or the like.

User interface 500 can also include a fourth display region 516 that displays information associated with linear aggregation models that can be selected for use by the content annotation system. For example, a first subregion 518 of UI 500 can be provided for selection of PBA model 518 (e.g., performed by PBA component 200), second subregion 520 of UI 500 can be provided for selection of PTBA model 520 (e.g., performed by PTBA component 202) and/or third subregion 522 of UI 500 can be provided for selection of MPTBA model 522 (e.g., performed by MPTBA component 204).

UI 500 can also include a fifth display region 524 including information that can be selected to perform one or more different acts/processes including, but not limited to, generating weight information for use by the linear aggregation model, generating a final score (which is then employed to determine whether a final entity annotation will be applied to the content), generating a final entity if the entity annotation will be applied to the content and/or annotating the content with the entity.

Figure 6:
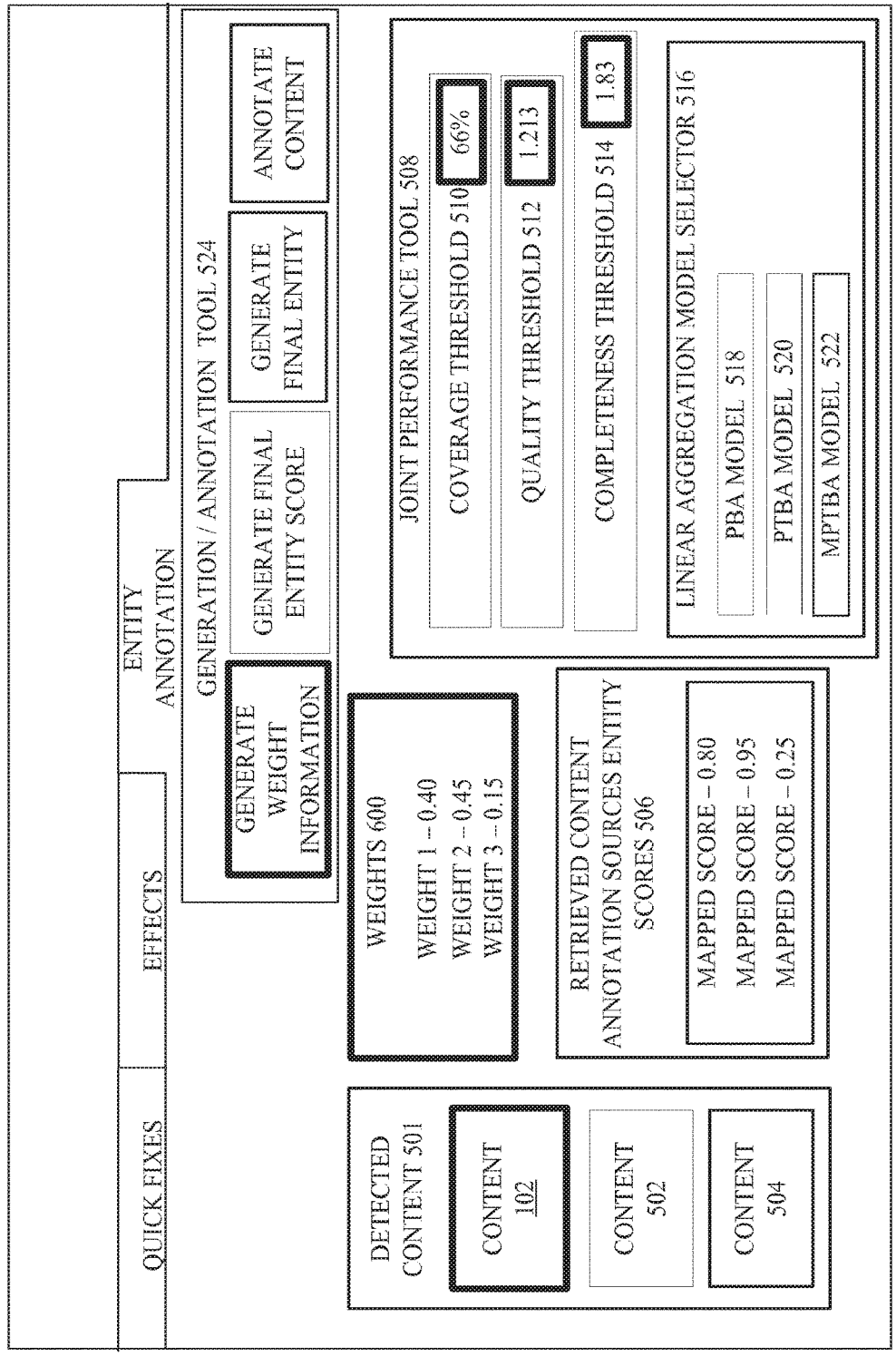

As shown in FIG. 6, a portion of UI 500 can be activated to generate weight information (e.g., weights 600). The weights can be used by the linear aggregation model towards the goal of satisfying the joint performance conditions. A threshold can also be generated. In the embodiment shown, the weights generated are 0.40, 0.45 and 0.15. The weights can be the values for one or more, $\lambda_r$.

Figure 7:
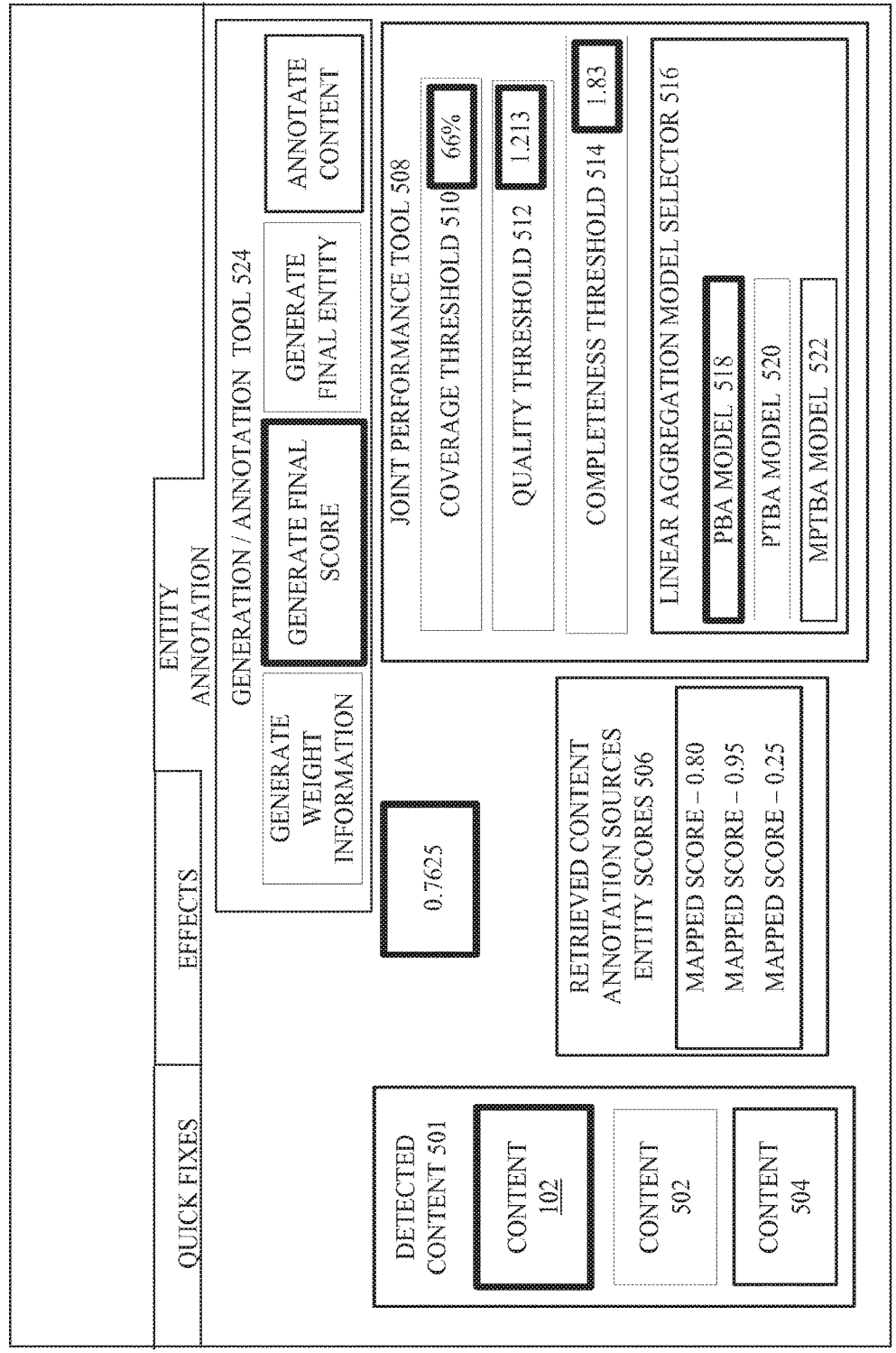

Now turning to FIG. 7, a portion of UI 500 can be activated to generate a final score by applying the weights generated by the content annotation system to the calibrated entity scores output from one or more isotonic regression component and combining the weighted scores. If the final score (e.g., 0.7625) is greater than the threshold (which is calculated to satisfy joint quality, coverage and/or completeness requirements), the entity corresponding to the final score is applied to the content. Otherwise, the entity is not applied to the content.

Figure 8:
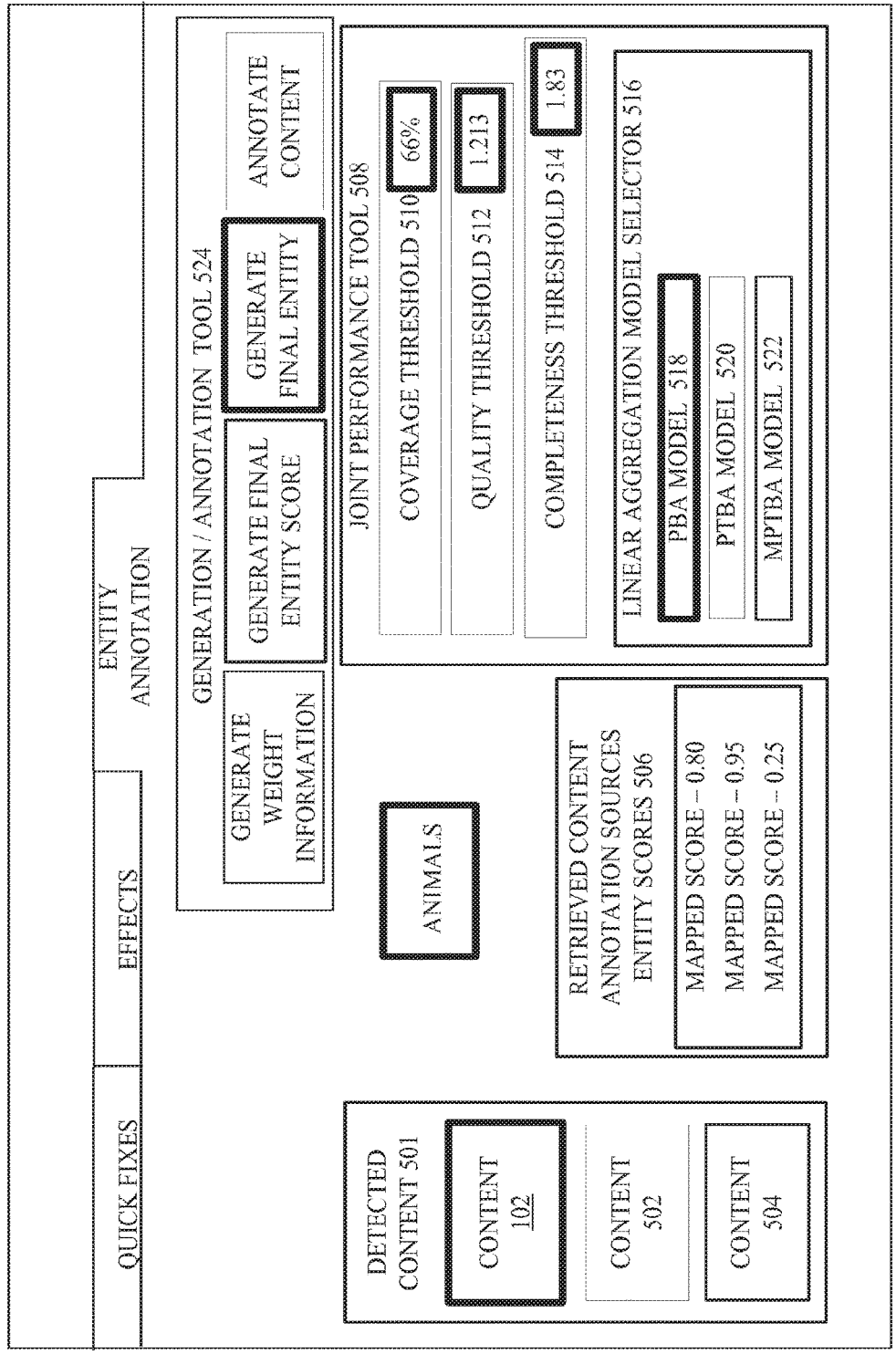

As shown in FIG. 8, a portion of UI 500 can be activated to determine or select one or more entities associated with the final score, or final entities. For example, a final score of 0.7625 can be associated with the entity "animals."

Figure 9:
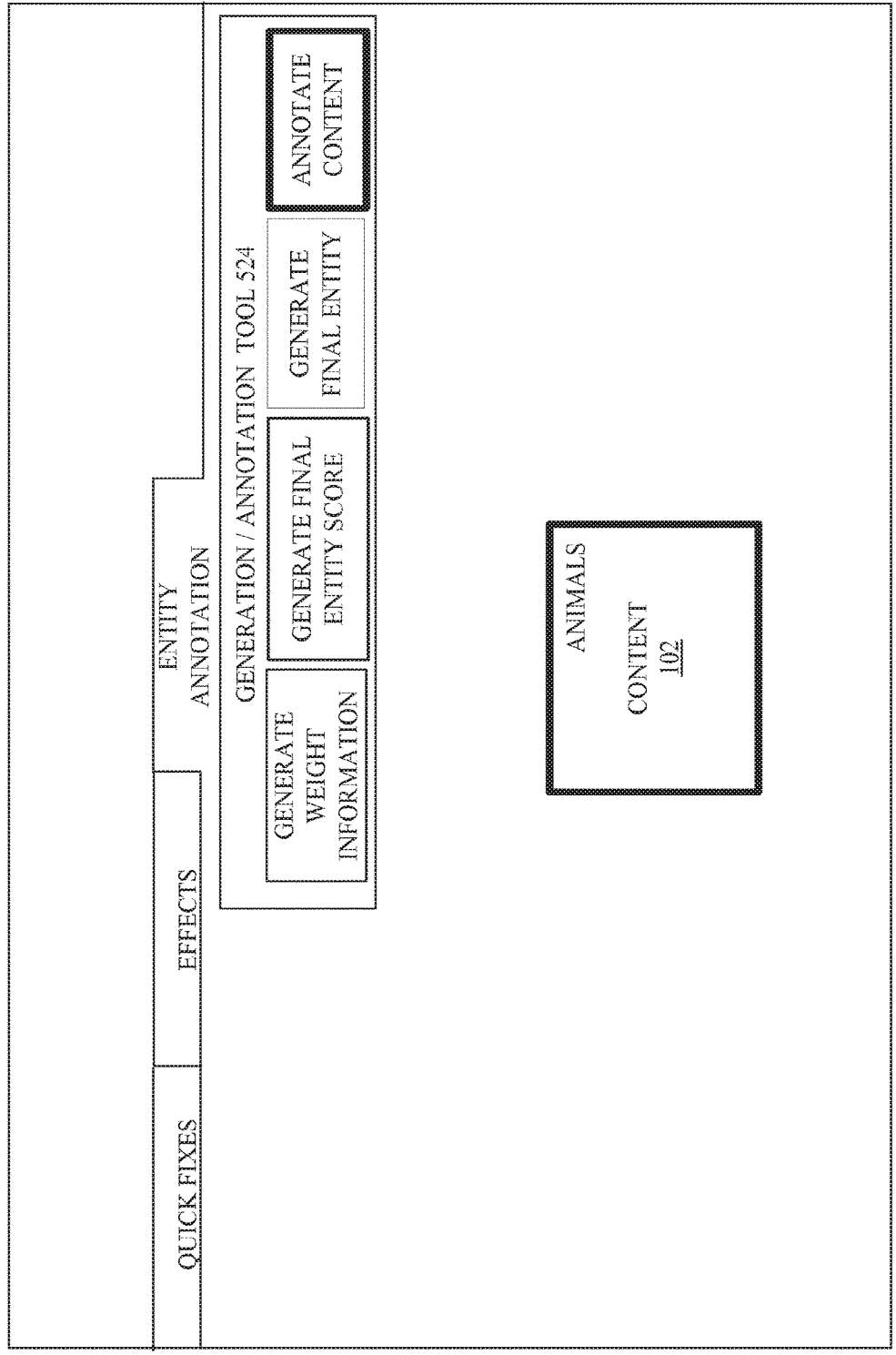

With reference to FIG. 9, a portion of UI 500 can be activated to annotate selected content 102 with the final entity if the final score associated with the final entity is great than or substantially equal to the threshold. In the embodiment shown, content 102 is annotated with entity "animals."

The embodiments described herein can be employed in various different systems and/or with various different methods. For example, one or more of the embodiments can be employed to annotate content uploaded to the content annotation system and/or accessed by the content annotations system. Advertisement targeting can be performed for annotated content based on the entities with which the content is annotated. As another example, advertisement can be identified and/or selected for playing while the entity annotated content is playing based on similarity between the entity with which the content is annotated and the subject matter of the advertisement. As another example, search engine results can be improved utilizing the entity annotation.

Yet, in other cases, embodiments described herein can be employed to determine likelihood that different information has a defined level of relatedness. For example, when a first person sets a second person as a friend status (or any other type of relationship status), there are different ways to figure out the relationship between people. For example, same interest, same geographical region and/or friend of a friend. Different content annotation sources can generate different scores based on whether the annotation source evaluates interest, geographical region and/or whether the second person is a friend of a friend of the first person. The scores can be calibrated and weighed to generate a final score. The final score can be compared to a threshold to determine whether the second person is likely to have a desire to be friends (or have some other relationship) with the first person.

Although UI 500 is described as a UI for a content annotation system, in various embodiments, there can be desktop, laptop, tablet, and mobile device versions of user interface 500 to account for and optimize utilization of the screen for these different devices.

FIGS. 10, 11, 12 and 13 are illustrations of non-limiting flow diagrams of methods that facilitate content entity annotation while satisfying joint performance conditions in accordance with one or more embodiments described herein. One or more of methods 1000, 1100, 1200, 1300 can be utilized in various systems including, but not limited to, network systems, computer network systems, communication systems, router systems, server systems, high availability server systems (e.g., Telecom server systems), web server systems, file server systems, content server systems, disk array systems, powered insertion board systems and/or cloud-based systems.

Figure 10:
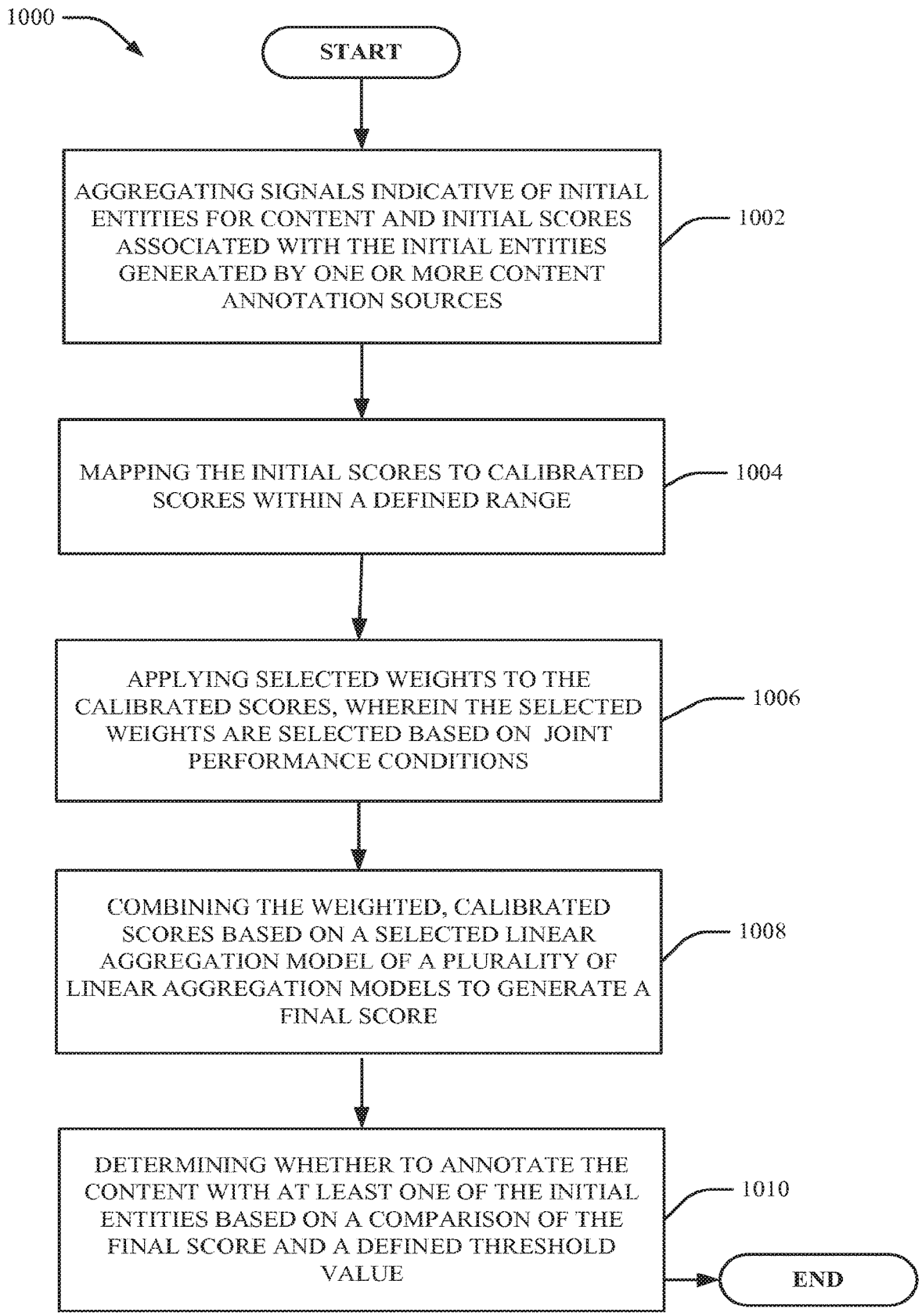
FIGS. 10, 11, 12 and 13 are illustrations of non-limiting flow diagrams of methods that facilitate content entity annotation while satisfying joint performance conditions in accordance with one or more embodiments described herein.

Turning first to FIG. 10, at 1002, method 1000 can include aggregating signals indicative of initial entities for content and initial scores associated with the initial entities generated by one or more content annotation sources (e.g., using aggregation component 110). At 1004, method 1000 can include mapping the initial scores to calibrated scores within a defined range (e.g., using mapping component 116).

At 1006, method 1000 can include applying weights to the calibrated scores, wherein the selected weights are selected based on satisfaction of joint performance conditions (e.g., using linear aggregation component 124). At 1008, method 1000 can include combining the calibrated scores based on a selected linear aggregation model of a plurality of linear aggregation models to generate a final score (e.g., using linear aggregation component 124).

At 1010, method 1000 can include determining whether to annotate the content with at least one of the one or more entities based on a comparison of the final score and a defined threshold value (e.g., entity annotation component 134).

Figure 11:
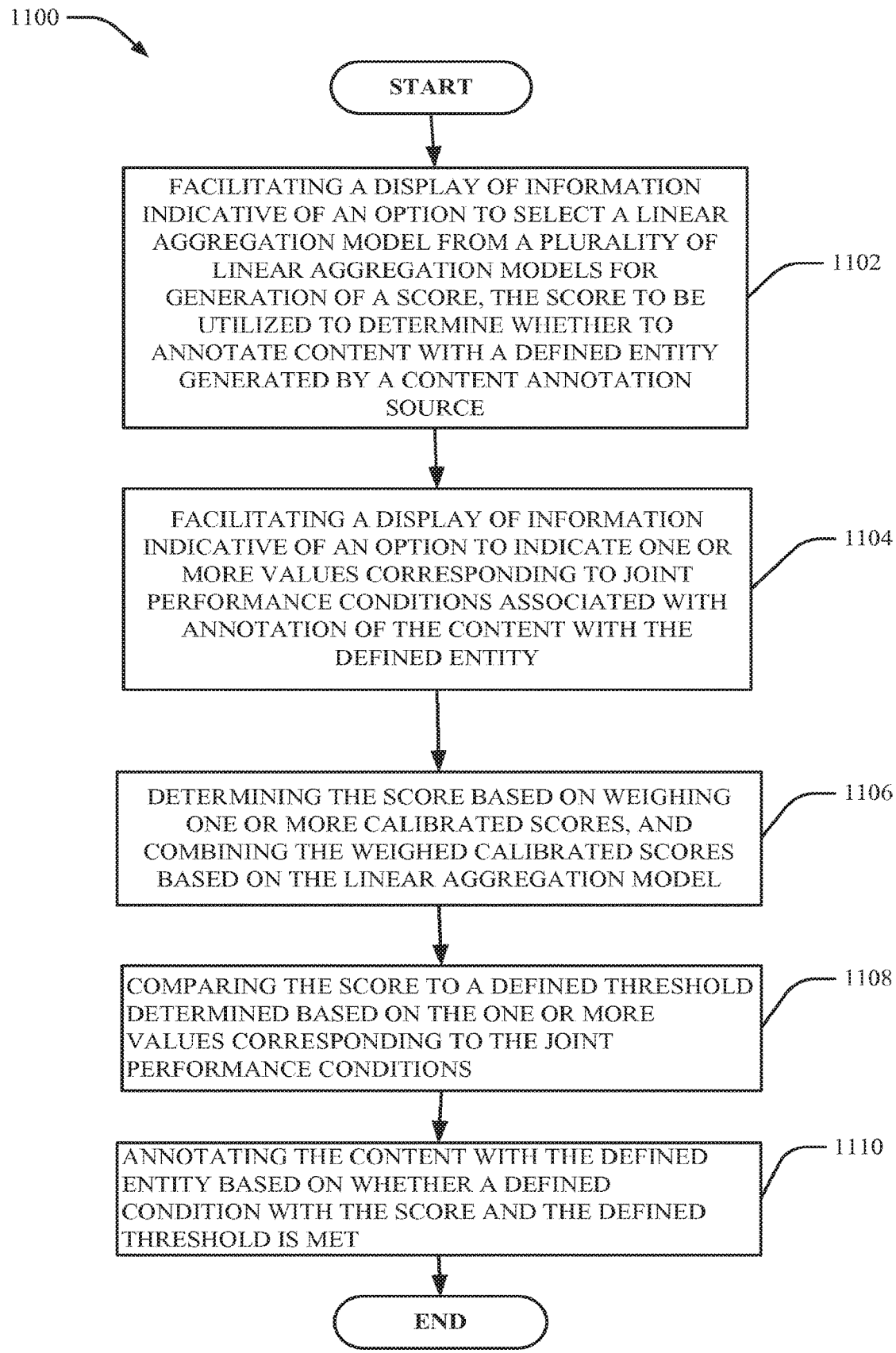

Turning now to FIG. 11, at 1102, method 1100 can include facilitating a display of information indicative of an option to select a linear aggregation model from a plurality of linear aggregation models for generation of a score, the score to be utilized to determine whether to annotate content with a defined entity generated by a content annotation source (e.g., using user interface component 404 and/or user interface 500).

At 1104, method 1100 can include facilitating a display of information indicative of an option to indicate one or more values corresponding to joint performance conditions associated with annotation of the content with the defined entity (e.g., using user interface component 404 and/or user interface 500).

At 1106, method 1100 can include determining the score based on weighing one or more calibrated scores, and combining the weighed calibrated scores based on the linear aggregation model (e.g., using linear aggregation component 124). At 1108, method 1100 can include comparing the score to a defined threshold determined based on the one or more values corresponding to the joint performance conditions (e.g., using threshold component 132).

At 1110, method 1100 can include annotating the content with the defined entity based on whether a defined condition with the score and the defined threshold is met (e.g., using entity annotation component 134).

Figure 12:
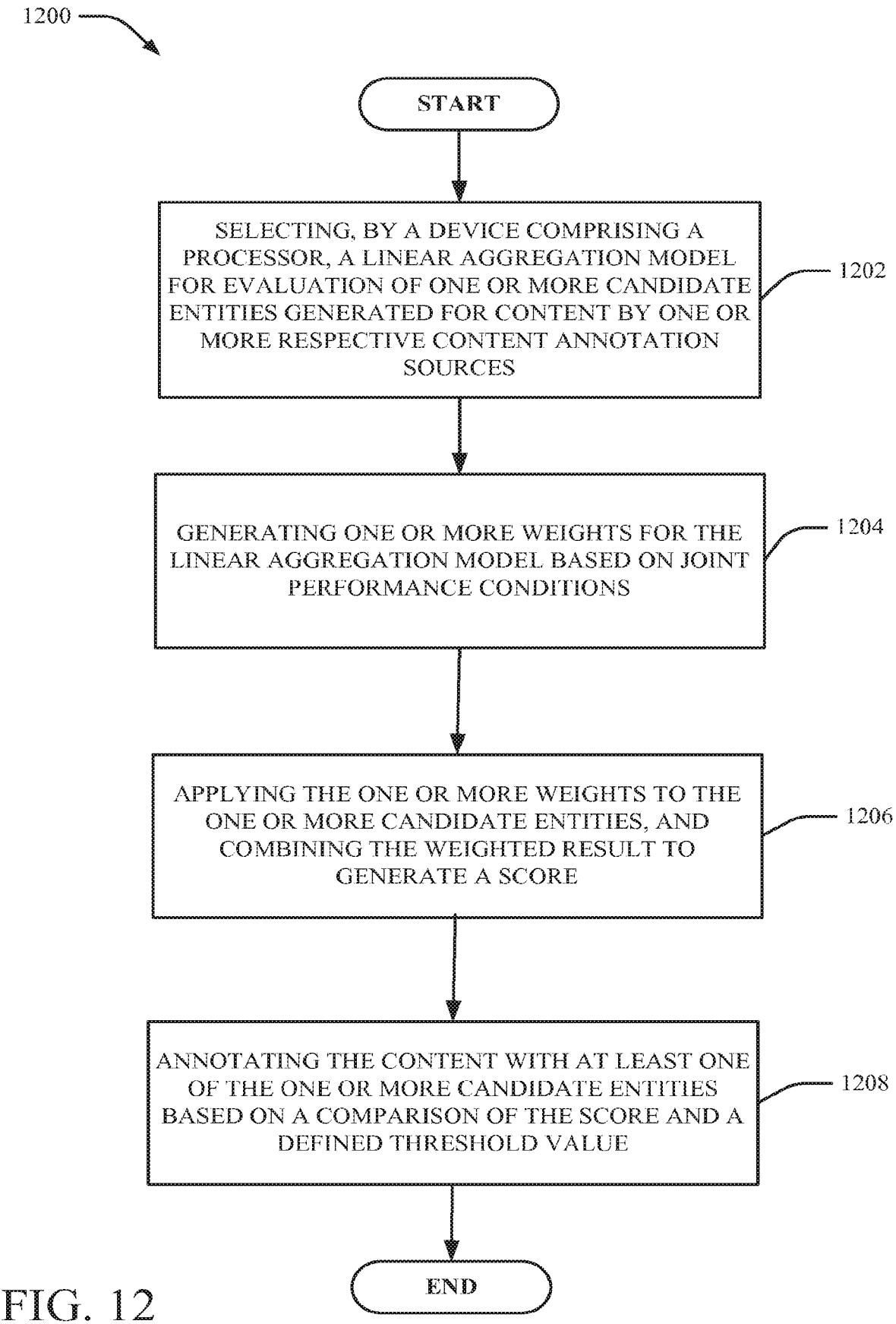

Turning to FIG. 12, at 1202, method 1200 can include selecting, by a device comprising a processor, a linear aggregation model for evaluation of one or more candidate entities generated for content by one or more respective content annotation sources (e.g., using linear aggregation component 124). At 1204, method 1200 can include generating one or more weights for the linear aggregation model based on joint performance conditions (e.g., using weight and threshold generation component 130). At 1206, method 1200 can include applying the one or more weights to the one or more candidate entities, and combining the weighted result to generate a score (e.g., using linear aggregation component 124). At 1208, method 1200 can include annotating the content with at least one of the one or more candidate entities based on a comparison of the score and a defined threshold value (e.g., using entity annotation component 134).

Figure 13:
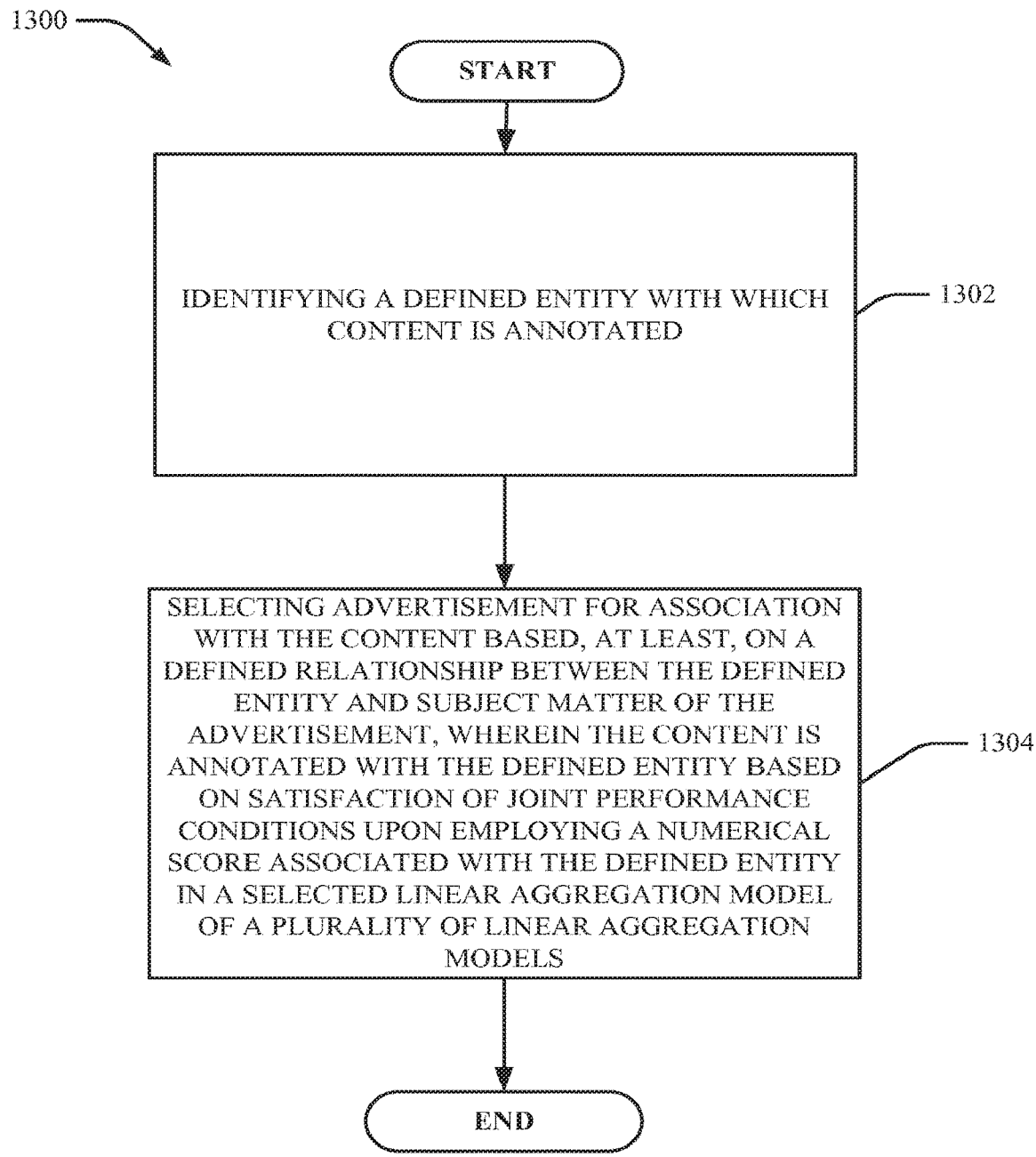

Turning to FIG. 13, at 1302, method 1300 can include identifying a defined entity with which content is annotated (e.g., using processor 138). In some embodiments, a component other than content annotation system 114 can be employed.

At 1304, method 1300 can include selecting advertisement for association with the content based, at least, on a defined relationship between the defined entity and subject matter of the advertisement, wherein the content is annotated with the defined entity based on satisfaction of joint performance conditions upon employing a numerical score associated with the defined entity in a selected linear aggregation model of a plurality of linear aggregation models (e.g., using processor 138). In some embodiments, a component other than content annotation system 114 can be employed.

EXAMPLE OPERATING ENVIRONMENTS

Figure 14:
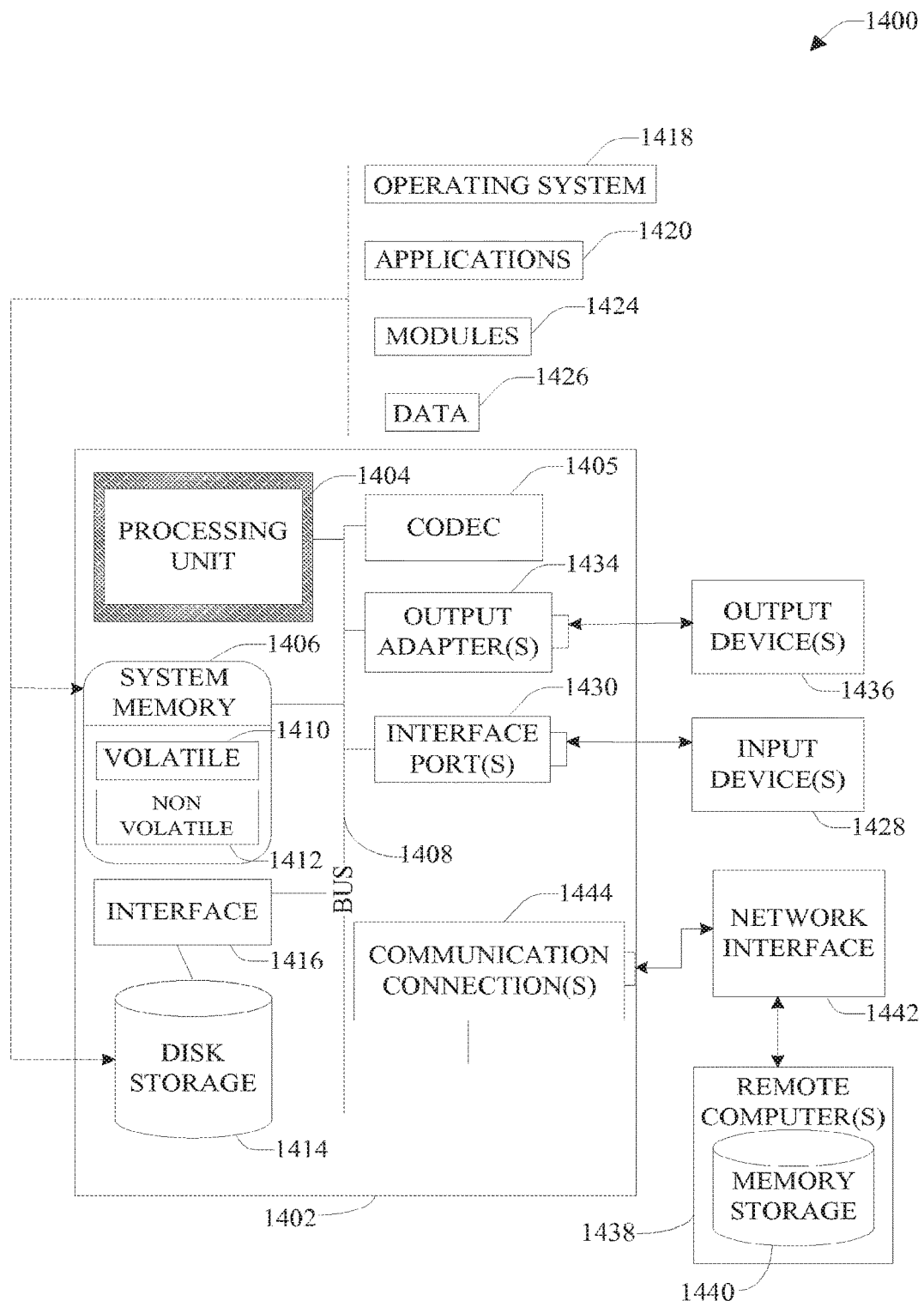
FIG. 14 is an illustration of a schematic diagram of a non-limiting operating environment for implementing one or more embodiments described in this disclosure.

FIG. 14 is an illustration of a schematic diagram of a non-limiting operating environment for implementing one or more embodiments described in this disclosure. The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

With reference to FIG. 14, a suitable environment 1400 for implementing various embodiments described herein is or can include a computer 1402. The computer 1402 includes a processing unit 1404, a system memory 1406, a codec 1405, and a system bus 1408. The system bus 1408 couples system components including, but not limited to, the system memory 1406 to the processing unit 1404. The processing unit 1404 can be any of various available processors. Dual microprocessors and other multiprocessor architectures also can be employed as the processing unit 1404.

The system bus 1408 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1406 includes volatile memory 1410 and non-volatile memory 1412. The basic input/output system (BIOS), containing the basic routines to transfer information between elements within the computer 1402, such as during start-up, is stored in non-volatile memory 1412. In addition, according to one or more embodiments, codec 1405 may include at least one of an encoder or decoder, wherein the at least one of an encoder or decoder may consist of hardware, a combination of hardware and software, or software. Although, codec 1405 is depicted as a separate component, codec 1405 may be contained within non-volatile memory 1412. By way of illustration, and not limitation, non-volatile memory 1412 can include read only memory (ROM), programmable ROM (PROM), electrically programmable ROM (EPROM), electrically erasable programmable ROM (EEPROM), or flash memory. Volatile memory 1410 includes random access memory (RAM), which acts as external cache memory. According to present aspects, the volatile memory may store the write operation retry logic (not shown in FIG. 14) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

Computer 1402 may also include removable/non-removable, volatile/non-volatile computer storage medium. FIG. 14 illustrates, for example, disk storage 1414. Disk storage 1414 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1414 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1414 to the system bus 1408, a removable or non-removable interface is typically used, such as interface 1416.

It is to be appreciated that FIG. 14 describes software that acts as an intermediary between users and the basic computer resources described in the suitable operating environment 1400. Such software includes an operating system 1418. Operating system 1418, which can be stored on disk storage 1414, acts to control and allocate resources of the computer 1402. Applications 1420 take advantage of the management of resources by operating system 1418 through program modules 1424, and program data 1426, such as the boot/shutdown transaction table and the like, stored either in system memory 1406 or on disk storage 1414. It is to be appreciated that the claimed subject matter can be implemented with various operating systems or combinations of operating systems.

A user enters commands or information into the computer 1402 through input device(s) 1428. Input devices 1428 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1404 through the system bus 1408 via interface port(s) 1430. Interface port(s) 1430 include, for example, a serial port, a parallel port, a game port, and a universal serial bus (USB). Output device(s) 1436 use some of the same type of ports as input device(s). Thus, for example, a USB port may be used to provide input to computer 1402, and to output information from computer 1402 to an output device 1436. Output adapter 1434 is provided to illustrate that there are some output devices 1436 like monitors, speakers, and printers, among other output devices 1436, which require special adapters. The output adapters 1434 include, by way of illustration and not limitation, video and sound cards that provide a means of connection between the output device 1436 and the system bus 1408. It should be noted that other devices and/or systems of devices provide both input and output capabilities such as remote computer(s) 1438.

Computer 1402 can operate in a networked environment using logical connections to one or more remote computers, such as remote computer(s) 1438. The remote computer(s) 1438 can be a personal computer, a server, a router, a network PC, a workstation, a microprocessor based appliance, a peer device, a smart phone, a tablet, or other network node, and typically includes many of the elements described relative to computer 1402. For purposes of brevity, only a memory storage device 1440 is illustrated with remote computer(s) 1438. Remote computer(s) 1438 is logically connected to computer 1402 through a network interface 1442 and then connected via communication connection(s) 1444. Network interface 1442 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1444 refers to the hardware/software employed to connect the network interface 1442 to the bus 1408. While communication connection 1444 is shown for illustrative clarity inside computer 1402, it can also be external to computer 1402. The hardware/software necessary for connection to the network interface 1442 includes, for exemplary purposes only, internal and external technologies such as, modems including regular telephone grade modems, cable modems and DSL modems, ISDN adapters, and wired and wireless Ethernet cards, hubs, and routers.

Figure 15:
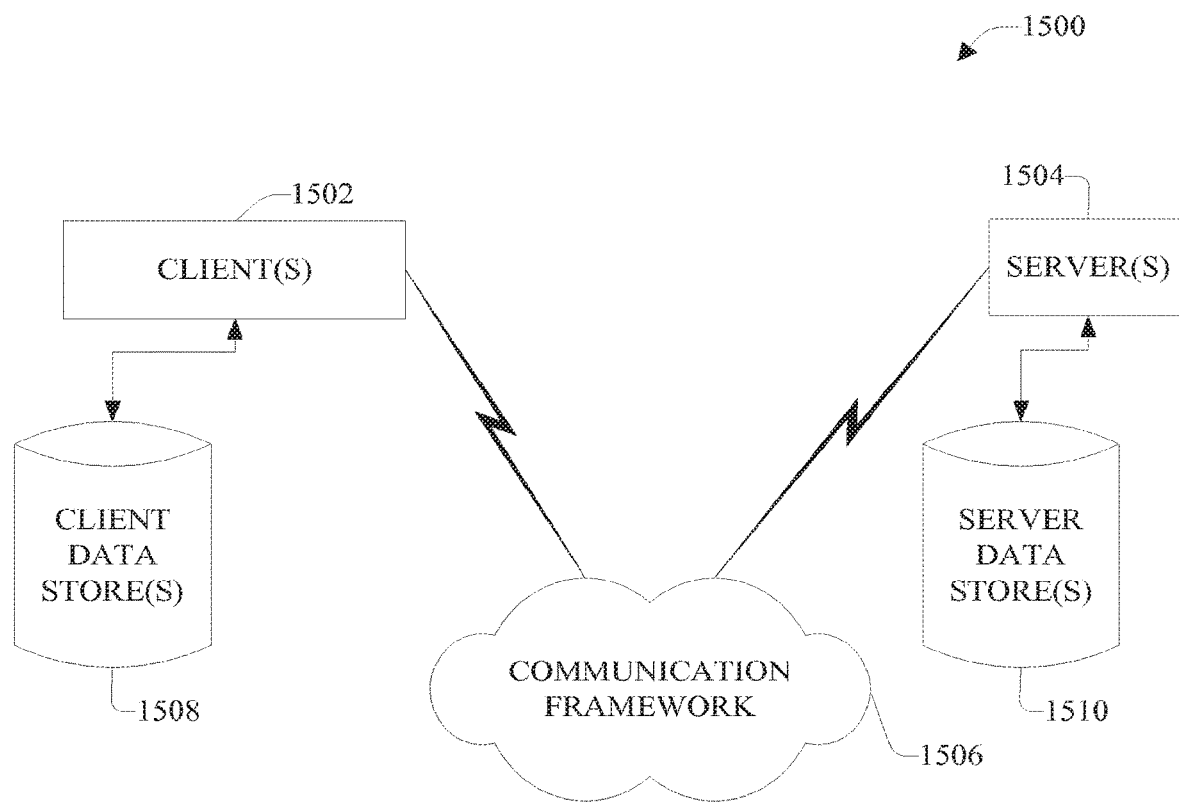
FIG. 15 is an illustration of a schematic diagram of a non-limiting computing environment for implementing one or more embodiments described in this disclosure.

Referring now to FIG. 15, there is illustrated a schematic block diagram of a computing environment 1500 for implementation of one or more embodiments described herein. The system 1500 includes one or more client(s) 1502 (e.g., laptops, smart phones, PDAs, media players, computers, portable electronic devices, tablets, and the like). The client(s) 1502 can be hardware and/or software (e.g., threads, processes, computing devices). The system 1500 also includes one or more server(s) 1504. The server(s) 1504 can also be hardware or hardware in combination with software (e.g., threads, processes, computing devices). The servers 1504 can house threads to perform transformations by employing aspects of this disclosure, for example. One possible communication between a client 1502 and a server 1504 can be in the form of a data packet transmitted between two or more computer processes wherein the data packet may include video data. The data packet can include a metadata, e.g., associated contextual information, for example. The system 1500 includes a communication framework 1508 (e.g., a global communication network such as the Internet, or mobile network(s)) that can be employed to facilitate communications between the client(s) 1502 and the server(s) 1504.

Communications can be facilitated via a wired (including optical fiber) and/or wireless technology. The client(s) 1502 include or are operatively connected to one or more client data store(s) 1510 that can be employed to store information local to the client(s) 1502 (e.g., associated contextual information). Similarly, the server(s) 1504 are operatively include or are operatively connected to one or more server data store(s) 1510 that can be employed to store information local to the servers 1504.

In one embodiment, a client 1502 can transfer an encoded file, in accordance with the disclosed subject matter, to server 1504. Server 1504 can store the file, decode the file, or transmit the file to another client 1502. It is to be appreciated, that a client 1502 can also transfer uncompressed file to a server 1504 and server 1504 can compress the file in accordance with the disclosed subject matter. Likewise, server 1504 can encode video information and transmit the information via communication framework 1508 to one or more clients 1502.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the one or more of the embodiments described herein. Furthermore, it can be appreciated that many of the various components can be implemented on one or more IC chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the embodiments are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that one or more embodiments includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular aspect of an embodiment may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A non-transitory computer-readable storage medium of a content annotation system comprising computer-readable instructions that, in response to execution, cause a computing system to perform operations, the operations comprising:
    receiving, from each of a plurality of content annotation sources in communication with the content annotation system, an entity for content and an initial score of the entity, wherein each initial score is expressed in a first value range defined by the content annotation source from which the initial score is received;

mapping the initial scores to respective values of a second value range defined by the content annotation system to generate calibrated scores;

applying weights to the calibrated scores to generate weighted scores;

generating a final score for at least some of the entities by combining the weighted scores using a linear aggregation model based on at least one or both of a first coverage constraint for the content or a first completeness constraint for the content;

determining whether to annotate the content using an entity of the at least some of the entities based on a comparison of the final score for the entity and a threshold defined based on one or both of a second coverage constraint for the content or a second completeness constraint for the content;

responsive to determining to annotate the content using the entity, producing annotated content by annotating the content using the entity; and outputting the annotated content for viewing within a software application.

2. The non-transitory computer-readable storage medium of claim 1, wherein determining whether to annotate the content using an entity of the at least some of the entities based on a comparison of the final score for the entity and a threshold defined based on one or both of a second coverage constraint for the content or a second completeness constraint for the content comprises:

determining to annotate the content using the entity based on the comparison indicating that the final score for the entity is greater than the threshold.

3. The non-transitory computer-readable storage medium of claim 1, wherein mapping the initial scores to respective values of a second value range defined by the content annotation system to generate calibrated scores comprises:

mapping the initial scores to the respective values within the second value range by employing isotonic regression.

4. The non-transitory computer-readable storage medium of claim 1, wherein the entity is associated with a property based on a calibrated score of the calibrated scores, and wherein the property is indicative of a level of relevance of the entity to the content as determined by the content annotation source from which the entity is received.

5. The non-transitory computer-readable storage medium of claim 4, wherein the property is indicative of at least one of the entity being central to the content, the entity being relevant to the content, or the entity being off-topic relative to the content.

6. The non-transitory computer-readable storage medium of claim 1, the operations further comprising:

selecting the linear aggregation model using probabilities associated with the entities received from the content annotation sources.

7. The non-transitory computer-readable storage medium of claim 1, the operations further comprising:

selecting the linear aggregation model using a logarithm of one or more probabilities associated with the entities received from the content annotation sources.

8. The non-transitory computer-readable storage medium of claim 1, the operations further comprising:

generating the weights; and selecting the weights using joint performance conditions corresponding at least two of the first coverage constraint for the content, the first completeness constraint for the content, or a quality constraint for the content.

9. The non-transitory computer-readable storage medium of claim 8, wherein generating the weights comprises:

performing random initialization and adjustment of one or more step sizes to generate the weights.

10. The non-transitory computer-readable storage medium of claim 8, wherein generating the weights comprises:

performing random initialization and one or more gradient updates to generate the weights.

11. The non-transitory computer-readable storage medium of claim 8, wherein at least one of the weights is a non-unit weight.

12. The non-transitory computer-readable storage medium of claim 8, the operations further comprising:

receiving information indicative of the joint performance conditions.

13. The non-transitory computer-readable storage medium of claim 1, wherein the first coverage constraint is equal to the second coverage constraint and the first completeness constraint is equal to the second completeness constraint.

14. A computer server of a content annotation system, comprising:

a processor; and a non-transitory computer-readable medium storing computer program instructions executable by the processor to perform steps comprising:

receiving, from each of a plurality of content annotation sources in communication with the content annotation system, an entity for content and an initial score of the entity, wherein by the content annotation source from which the initial score is received;

mapping the initial scores to respective values of a second value range defined by the content annotation system to generate calibrated scores;

applying weights to the calibrated scores to generate weighted scores;

generating a final score for at least some of the entities by combining the weighted scores using a linear aggregation model based on at least one or both of a first coverage constraint for the content or a first completeness constraint for the content;

determining whether to annotate the content using an entity of the at least some of the entities based on a comparison of the final score for the entity and a threshold defined based on one or both of a second coverage constraint for the content or a second completeness constraint for the content;

responsive to determining to annotate the content using the entity, producing annotated content by annotating the content using the entity; and outputting the annotated content for viewing within a software application.

15. The computer server of claim 14, wherein mapping the initial scores to respective values of a second value range defined by the content annotation system to generate calibrated scores comprises:

mapping the initial scores to the respective values within the second value range by employing isotonic regression.

16. The computer server of claim 14, wherein the entity is associated with a property based on a calibrated score of the calibrated scores, and wherein the property is indicative of a level of relevance of the entity to the content as determined by the content annotation source from which the entity is received.

17. The computer server of claim 16, wherein the property is indicative of at least one of the entity being central to the content, the entity being relevant to the content, or the entity being off-topic relative to the content.

18. The computer server of claim 14, the steps further comprising:
    selecting the linear aggregation model using at least one of probabilities associated with the entities received from the content annotation sources or a logarithm of one or more probabilities associated with the entities received from the content annotation sources.

19. The computer server of claim 14, the steps further comprising:
    generating the weights by performing at least one of random initialization and adjustment of one or more step sizes or random initialization and one or more gradient updates; and
    selecting the weights using joint performance conditions corresponding at least two of the first coverage constraint for the content, the first completeness constraint for the content, or a quality constraint for the content.

20. The computer server of claim 14, wherein the first coverage constraint is equal to the second coverage constraint and the first completeness constraint is equal to the second completeness constraint.

\* \* \* \* \*